(12) United States Patent
Ingram

(10) Patent No.: US 7,202,891 B1
(45) Date of Patent: Apr. 10, 2007

(54) METHOD AND APPARATUS FOR A CHOPPED TWO-CHIP CINEMATOGRAPHY CAMERA

(75) Inventor: Simon G. Ingram, Waterloo (CA)

(73) Assignee: Dalsa, Inc., Waterloo, Ontario (CA)

( * ) Notice: Subject to any disclaimer, the term of this patent is extended or adjusted under 35 U.S.C. 154(b) by 726 days.

(21) Appl. No.: 10/053,558

(22) Filed: Jan. 24, 2002

Related U.S. Application Data

(60) Provisional application No. 60/284,697, filed on Apr. 19, 2001, provisional application No. 60/263,707, filed on Jan. 25, 2001, provisional application No. 60/263,528, filed on Jan. 24, 2001.

(51) Int. Cl.
*H04N 9/73* (2006.01)

(52) U.S. Cl. .................. 348/224.1; 348/262

(58) Field of Classification Search ............. 348/224.1, 348/222.1, 208.8, 208.11, 218.1, 270, 262
See application file for complete search history.

(56) References Cited

U.S. PATENT DOCUMENTS

| | | | |
|---|---|---|---|
| 2,515,762 A | 7/1950 | Dimmick | |
| 2,679,010 A | 5/1954 | Luft | |
| 3,237,509 A | 3/1966 | Fielding | |
| 3,366,795 A | 1/1968 | Ravitsky et al. | |
| 3,404,283 A | 10/1968 | Stanfill, III et al. | |
| 3,439,985 A | 4/1969 | Comstock, Jr. et al. | |
| 3,600,504 A | 8/1971 | Reilly | |
| 3,603,722 A | 9/1971 | Graham | |
| 3,654,385 A | 4/1972 | Flagle | |
| 3,789,132 A | 1/1974 | Larsen | |
| 3,837,004 A | 9/1974 | Kennedy | |
| 4,016,598 A | 4/1977 | Yamanaka | |
| 4,107,732 A | 8/1978 | Adcock et al. | |
| 4,183,052 A | 1/1980 | Yamanaka et al. | |
| 4,404,585 A | 9/1983 | Hjortzberg | |
| 4,510,529 A | 4/1985 | Gottschalk | |
| 4,524,390 A | 6/1985 | Lemke | |
| 4,587,564 A | 5/1986 | Dischert | |
| 4,642,677 A | 2/1987 | Takanashi et al. | |
| 4,667,226 A | 5/1987 | Glenn | |
| 4,704,699 A | 11/1987 | Farina et al. | |
| 4,734,756 A | 3/1988 | Butterfield et al. | |
| 4,878,109 A | 10/1989 | Hillis | |
| 5,099,317 A | 3/1992 | Takemura | |
| 5,103,301 A | 4/1992 | Cosentino | |
| 5,241,170 A | 8/1993 | Field, Jr. et al. | |
| 5,561,460 A * | 10/1996 | Katoh et al. ............. | 348/219.1 |
| 5,764,285 A * | 6/1998 | Ochi et al. ............... | 348/222.1 |
| 5,801,758 A | 9/1998 | Heirich | |
| 5,850,277 A | 12/1998 | Dang et al. | |
| 5,863,125 A | 1/1999 | Doany | |

(Continued)

*Primary Examiner*—Vivek Srivastava
*Assistant Examiner*—Gevell Selby
(74) *Attorney, Agent, or Firm*—Millen, White, Zelano & Branigan, P.C.

(57) ABSTRACT

A method of capturing a color image includes steps of operating a first sensor of a camera to integrate a first charge over a first time interval, operating a second sensor of the camera to integrate a second charge over a second time interval and scanning the first and second sensors to readout the respective first and second charges during a third time interval. The first time interval overlaps the second time interval. The third time interval includes no overlapping time with the first time interval. The third time interval includes no overlapping time with the second time interval.

7 Claims, 24 Drawing Sheets

U.S. PATENT DOCUMENTS

| | | |
|---|---|---|
| 5,868,482 A | 2/1999 | Edlinger et al. |
| 5,883,696 A | 3/1999 | Bowers et al. |
| 6,005,616 A | 12/1999 | Itoh et al. |
| 6,024,453 A | 2/2000 | Edlinger et al. |
| 6,147,720 A | 11/2000 | Guerinot et al. |
| 6,788,338 B1* | 9/2004 | Dinev et al. ............. 348/222.1 |
| 6,891,568 B1* | 5/2005 | Glenn ........................ 348/262 |
| 2001/0030696 A1* | 10/2001 | Glenn ........................ 348/262 |

* cited by examiner

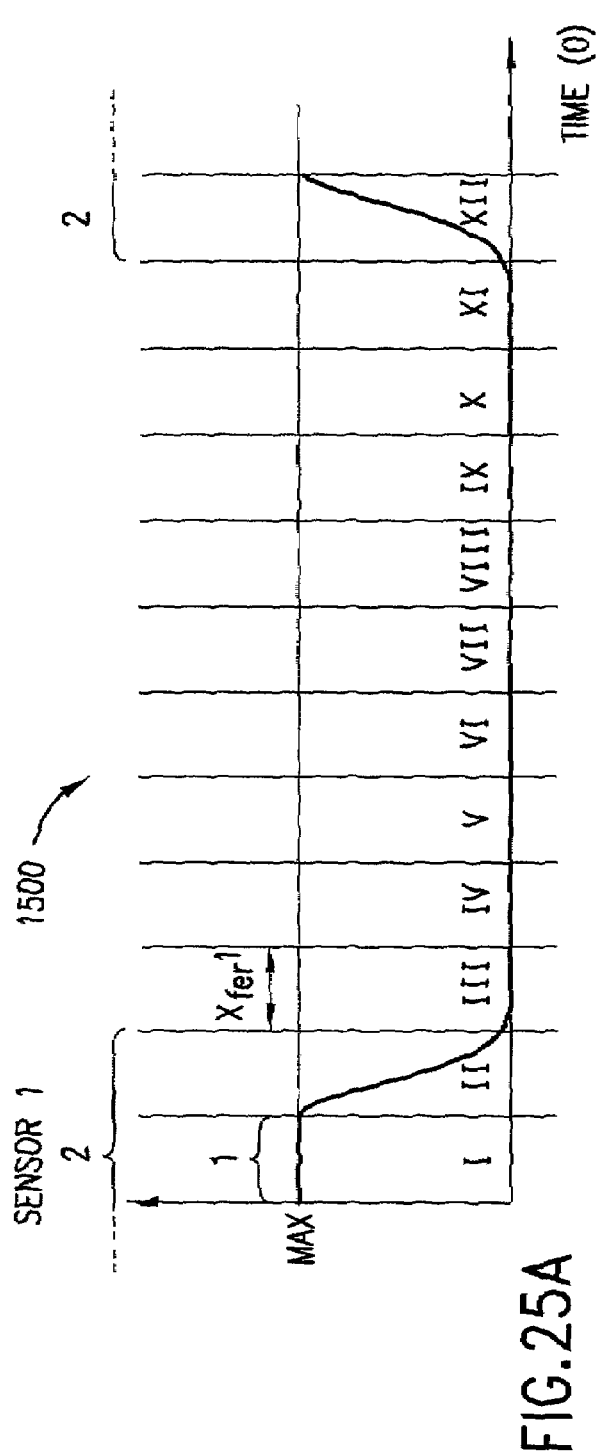
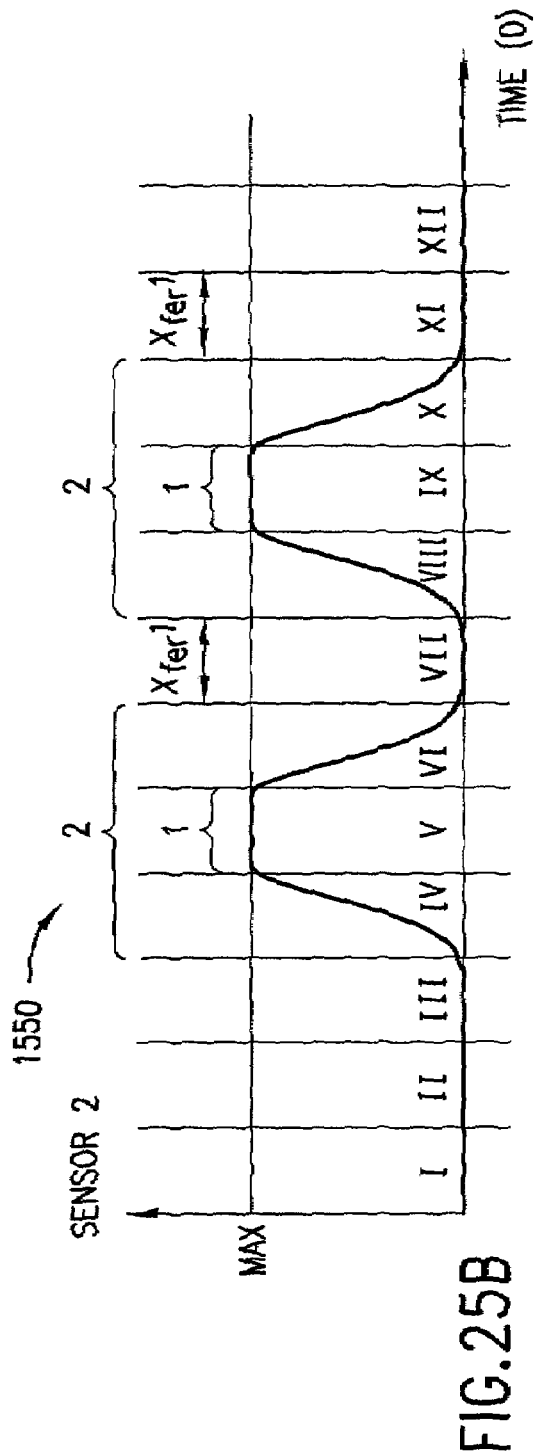
FIG.25A
FIG.25B

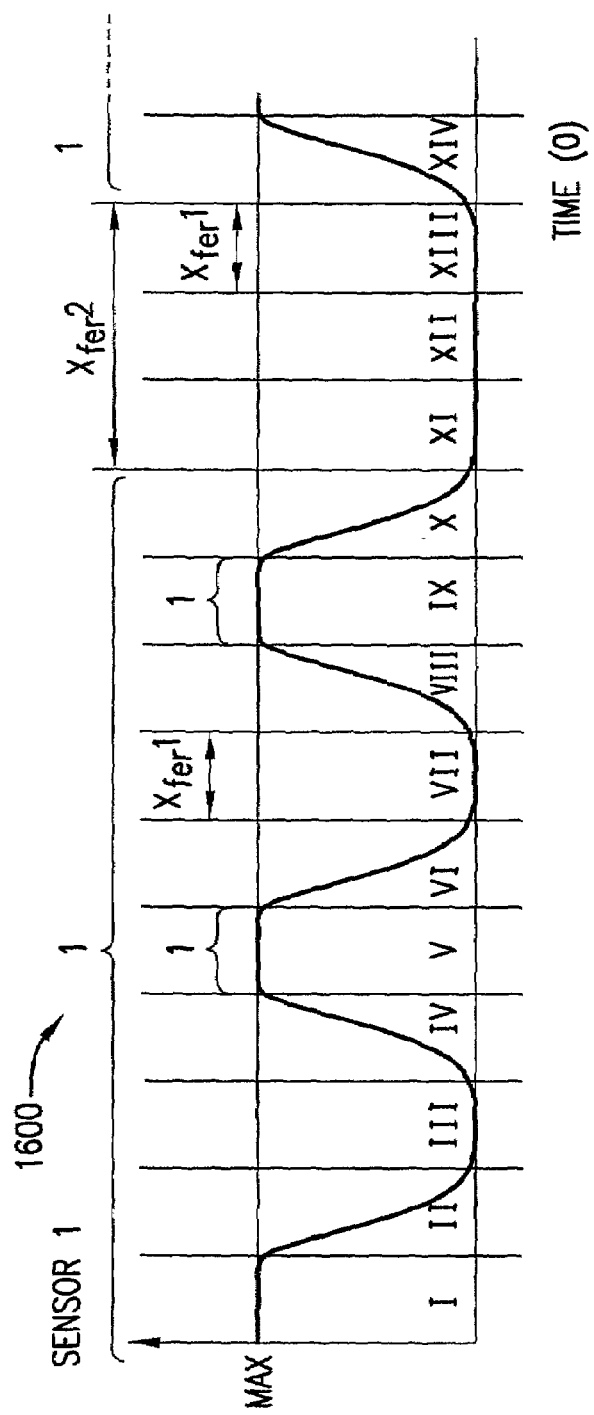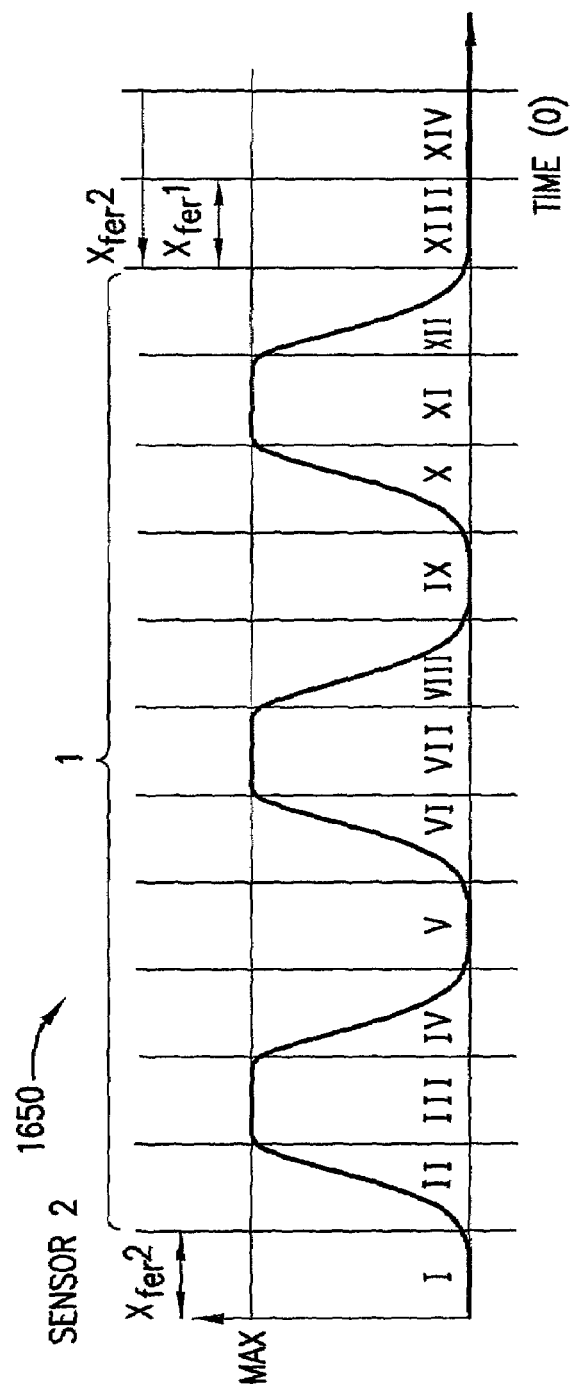
FIG. 26A
FIG. 26B

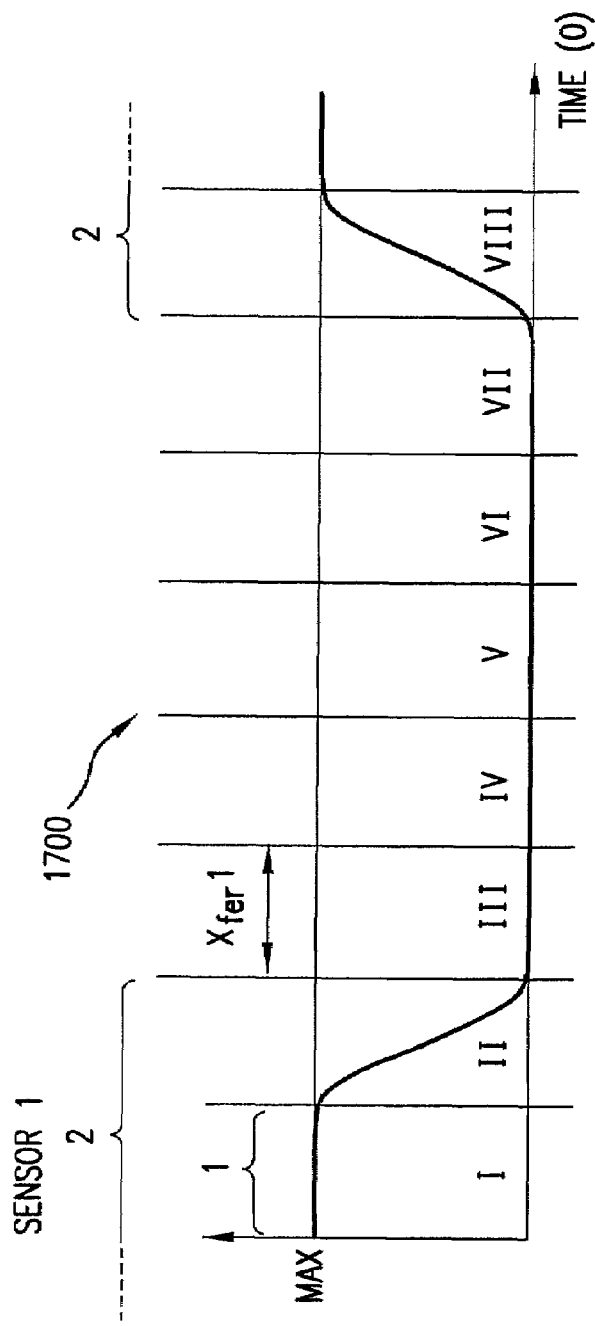
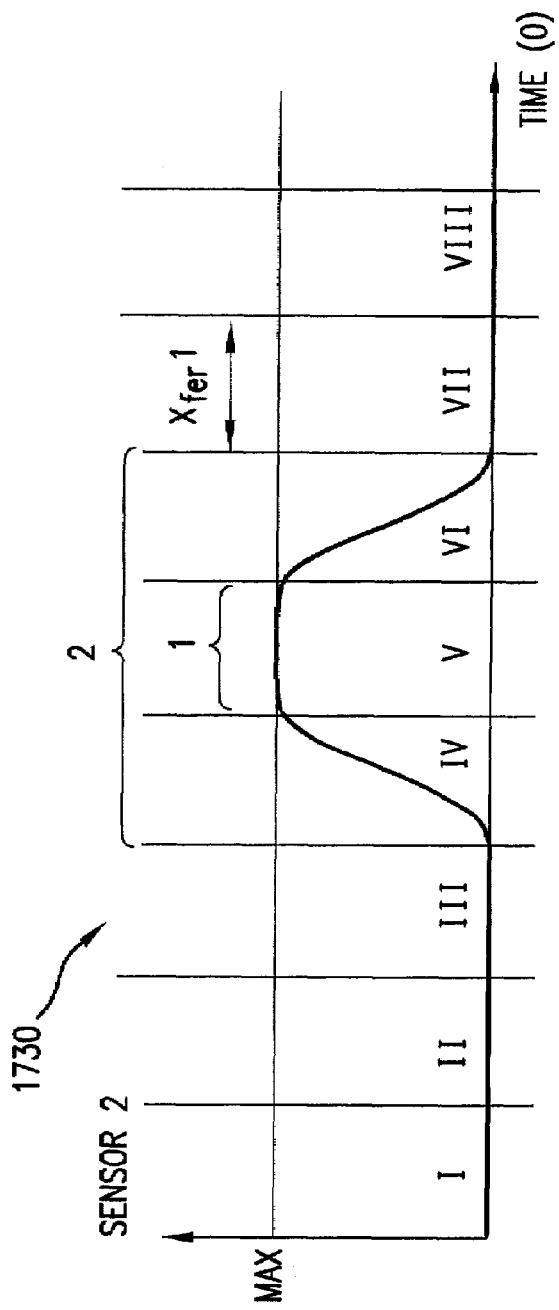
FIG. 27A
FIG. 27B

METHOD AND APPARATUS FOR A CHOPPED TWO-CHIP CINEMATOGRAPHY CAMERA

The priority benefit of the Jan. 24, 2001 filing date of provisional application Ser. No. 60/263,528, the Jan. 25, 2001 filing date of provisional application Ser. No. 60/263,707, and the Apr. 19, 2001 filing date of provisional application Ser. No. 60/284,697 are hereby claimed.

BACKGROUND OF THE INVENTION

1. Field of the Invention

The present invention relates to a color cinematography camera with solid state imaging sensors. In particular, the invention relates to a scanning wheel-type color camera using plural sensors.

2. Description of Related Art

Color cameras are known. One type of color camera uses a single CCD imaging sensor with a Bayer pattern overlaying color filter. A Bayer pattern overlaying filter uses four sensor elements per pixel. The overlaying color filter, transmits green light into the first and second sensor elements, transmits blue into the third sensor element and transmits red light into the fourth sensor element. The four elements make up one pixel of a digital color camera. This tends to limit the resolution achievable by such color cameras.

Another type of color camera uses expensive prisms and custom lenses and three CCD imaging sensors. Ordinary spherical objective lenses pass the image light into a prism as converging (not parallel) rays of light. Because of dispersion characteristics that any optical material imparts on light passing through the material, the converging (not parallel) rays of light undergo different dispersions since the different rays of light have different path lengths. This leads to noticeable color distortions. To over come this, known cameras use a more complex color corrected objective lens.

In FIG. 29A, known camera 2000 includes lens 2010 to focus an image conjugate through color filter wheel 2050 onto imaging sensor 2040. Color filter wheel 2050 is divided into three color sectors, each sector representing one-third of a circle. Each sector 2052, 2054 and 2056 passes light (i.e., transmits, not reflects) of a different one of the three primary colors (i.e., blue, red and green) (FIG. 29B). A color wheel assembly includes motor 2020 to spin color filter wheel 2050. To obtain a full color image requires that sensor 2040 form three complete images for each revolution of color filter wheel 2050. When the camera system requires that moving images be captured at a particular rate, the time available for capture of each color image is just one-third of the frame time. This limits the sensitivity of the camera.

It should be noted that rotatable color wheels have been used in the projection TV industry (not cameras). For example, see U.S. Pat. Nos. 5,868,482 and 6,024,453.

Interline transfer (ILT) CCD sensors include an electronic shutter function to prevent smear effects. Known cameras require the ILT design to control smear.

It is desired to control smear and provide near synchronous imaging with a 2-chip frame transfer CCD or full-frame CCD based motion picture camera that will operate within the optical constraints of existing 35 mm motion picture lenses (the focal flange distance restricts the options for placement of the components).

Advantages of this approach include that the camera does not require an ILT sensor architecture, has higher fill factor, simpler clocking, large die size achieved through stitching not currently believed to be available to ILT designs, and does not require micro-lenses for recovery of fill factor and hence improved MTF (modulation transfer function).

SUMMARY OF THE INVENTION

An advantage of the present invention is that color artifacts are minimized. Another advantage is that the color quality of the image is improved.

These and other advantages are achieved in an a camera that includes a first sensor disposed to image light that propagates along a reflected axis and a second sensor disposed to image light that propagates along a direct axis. The camera further includes a rotatable structure disposed to define a rotation plane that is oblique to both the reflected axis and the direct axis. The rotatable structure has a first reflection sector, a first opaque sector disposed adjacent to the first reflection section, a first transmission sector disposed adjacent to the first opaque sector, a second reflection sector disposed adjacent to the first transmission sector, and a second transmission sector disposed adjacent to the second reflection sector.

These and other advantages are also achieved with a method of capturing a color image includes steps of operating a first sensor of a camera to integrate a first charge over a first time interval, operating a second sensor of the camera to integrate a second charge over a second time interval and scanning the first and second sensors to readout the respective first and second charges during a third time interval. The first time interval overlaps the second time interval. The third time interval includes no overlapping time with the first time interval. The third time interval includes no overlapping time with the second time interval.

BRIEF DESCRIPTION OF DRAWINGS

The invention will be described in detail in the following description of preferred embodiments with reference to the following figures wherein:

FIGS. 25A and 25B are timing diagrams of the operation of the fifth embodiment of the rotatable structure;

FIGS. 26A and 26B are timing diagrams of the operation of the choppered-wheel;

FIGS. 27A, 27B and 27C are timing diagrams of the operation of the 3-chip camera;

DETAILED DESCRIPTION OF PREFERRED EMBODIMENTS

Figure 1:
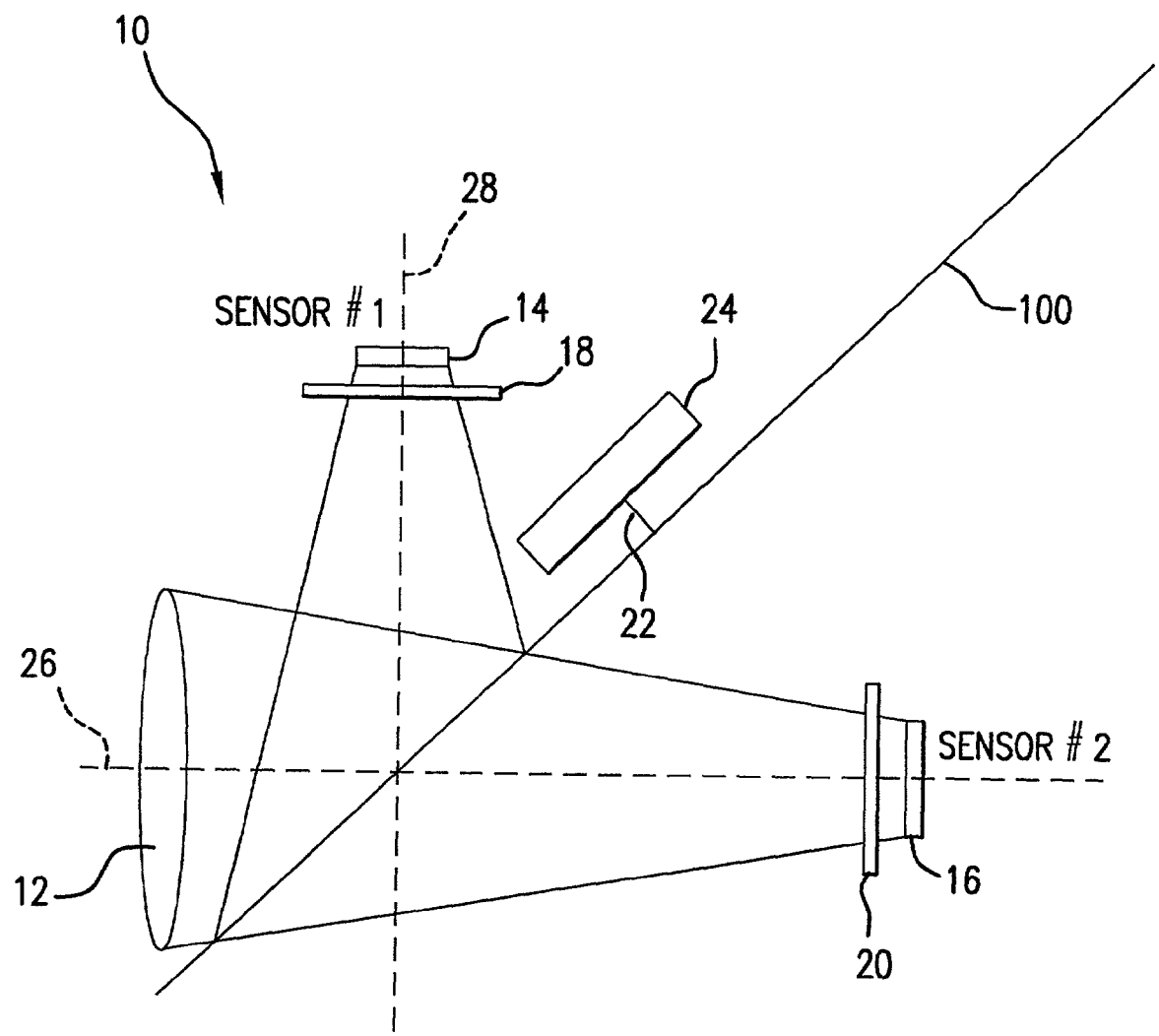
FIG. 1 is a schematic diagram of a preferred embodiment of a camera according to the present invention.

In FIG. 1, camera 10 includes lens 12, first imaging sensor 14, second imaging sensor 16, and rotatable structure 100. First imaging sensor 14 is disposed to receive light that propagates along reflected axis 28 and second imaging sensor 16 is disposed to receive light that propagates along direct axis 26. Rotatable structure 100 is disposed to define a rotation plane that is oblique to both reflected axis 28 and direct axis 26. In operation, motor 24 rotates axle 22 that in turn rotates rotatable structure 100. Lens 12 focuses an image conjugate onto second imaging sensor 16 along direct axis 26 such that second imaging sensor 16 converts the image light into electrical signals. Lens 12 also focuses the image conjugate onto first imaging sensor 14 along reflected axis 28. The image light through lens 12 along direct axis 26 is reflected from a reflection sector of rotatable structure 100 to propagate along reflected axis 28. First imaging sensor 14 converts the image light into electrical signals. Rotatable structure 100 is formed as a ring having an inner radius such that the image light focused by lens 12 does not impinge on motor 24 but only on the surface of rotatable structure 100. Other formations of rotatable structure 100 are also possible that satisfy the need to avoid motor 24.

In some variants of the invention, camera 10 also includes first color filter 18 disposed along reflected axis 28 between rotatable structure 100 and first sensor 14. In other variants of the invention, camera 10 further includes second color filter 20 disposed along direct axis 26 between rotatable structure 100 and second sensor 16.

Figure 2:
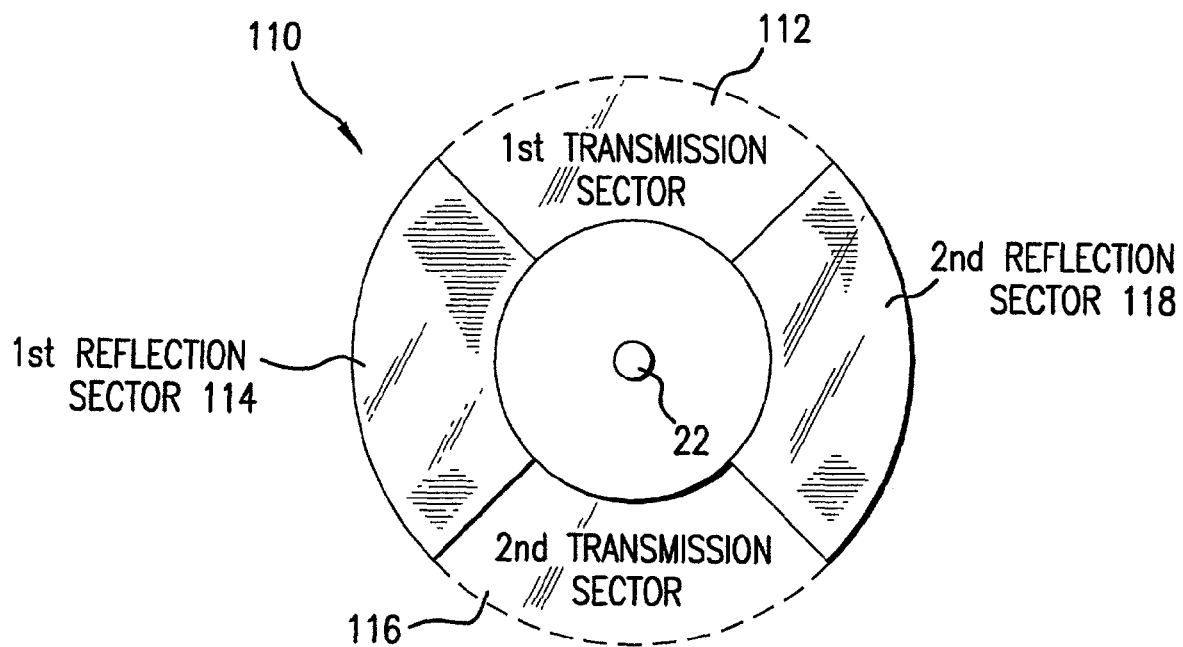
FIG. 2 is a schematic diagram of a first embodiment of a rotatable structure.

In one embodiment, the rotatable structure is first structure 110 (FIG. 2) that includes first transmission sector 112, first reflection sector 114 disposed adjacent to first transmission sector 112, second transmission sector 116 disposed adjacent to first reflection sector 114, and second reflection sector 118 disposed adjacent to second transmission sector 116. First and second transmission sectors 112 and 116 may be gaps (e.g., air-filled) or, in an alternative embodiment, a solid transparent media (e.g., glass or polycarbonate), as indicated in FIG. 2 by the dashed perimeter line. In some embodiments, each sector subtends one-fourth of a circle. Other embodiments may vary as described further herein.

In another embodiment, the rotatable structure is second structure 120 (FIG. 3) that includes first reflection sector 122, first opaque sector 124 disposed adjacent to first reflection sector 122, and first transmission 126 sector disposed adjacent to first opaque sector 124. First opaque sector 124 is formed of an absorbing material (e.g., smoked glass, etc.) such that first opaque sector 124 neither reflects nor transmits light. Imaging sensors 14 and 16 are operated with a timing control such that when first opaque sector 124 is positioned at the exit pupil of lens 12, the charge transfer operation of both imaging sensors 12 and 16 is performed. The length of the arc, or angular extent, of first opaque sector 124 is designed such that imaging sensors 14 and 16 remain in darkness for a time at least as long as is required to affect the transfer of image to the storage areas. Since second structure 120 rotates uniformly at a frame rate, first opaque sector 124 is designed to be large enough to provide blanking over the range of frame rates anticipated for camera 10.

The use of first opaque sector 124 with second structure 120 as an opaque shutter has particular advantages. With an opaque shuttered arrangement, imaging sensors 14 and 16 can be of a type referred to as a full-frame, or full-field, sensor. A full-frame sensor includes plural vertical channels over top of which are disposed plural horizontal poly clock lines and at a terminal end of the channels is a horizontal readout register. For example, a full-frame sensor to provide 512 lines by 683 pixels per line requires 683 vertical channels and 3 times 512 horizontal poly clock lines (for a three phase clocking structure). This simple sensor architecture has no electronic shutter capability. Instead, it relies on first opaque sector 124 to provide a shutter function. The full-frame sensors are controlled to collect the image (integrate) over the full time that the image light impinges on first transmission sector 126 and first reflection sector 122. Then, the full-frame sensors are controlled to shift the collected image down the vertical shift registers defined by the vertical channels and overlying clock lines into and out of the horizontal shift register over the time that the image light impinges on first opaque sector 124. The full-frame sensors use first opaque sector 124 to freeze the image so it will not smear while the image is being shifted out of the sensors. The full-frame sensor provides a maximum fill factor since it uses none of its topography under a light shield to provide an electronic shutter.

Actually, second imaging sensor 16 (in the direct path) is shuttered when either first opaque sector 124 or first reflection sector 122 blocks light along the direct path. Second imaging sensor 16 may use the time when either or both sectors block light as a time for smear-free readout. First imaging sensor 14 (in the reflection path) may similarly use either or both of first opaque sector 124 or first transmission sector 126 for smear-free readout.

Figure 3:
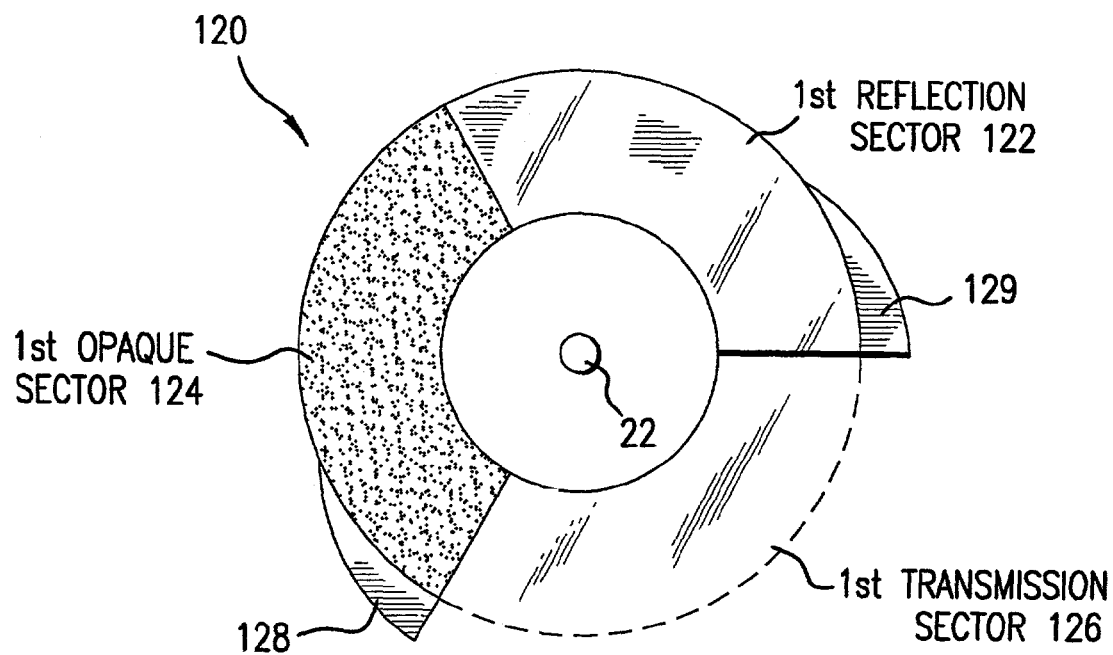
FIG. 3 is a schematic diagram of a second embodiment of the rotatable structure.

First transmission sector 126 may be a gap (air-filled) or, in an alternative embodiment, a solid transparent media (e.g., glass or polycarbonate), as indicated in FIG. 3 by the dashed perimeter line. Second structure 120 may also include counterweights 126 and 128, which serve to offset the mass distribution differential caused by transmission sector 126 when transmission sector 126 is an air-filled gap, thus preserving dynamic balance in second structure 120. The dynamic balancing function of second structure 120 may be achieved by other means, for example, relocating the placement of axle attachment point 22 to create a dynamically balanced rotatable structure. In some embodiments, each sector subtends one-third of a circle. Other embodiments may vary as described further herein.

Camera with Electronic Shutter

Camera 10 produces a complete color image by obtaining the image conjugate in a minimum of three colors, e.g., red, blue, and green. The requisite colors may be obtained using a variety of methods, as will be described herein. With reference to first structure 110 (FIG. 2), in operation, the light that propagates along reflected axis 28 is reflected from at least one of reflection sectors 114 and 118 and the light that propagates along direct axis 26 passes through at least one of transmission sectors 112 and 116. In one embodiment, reflection sectors 114 and 118 are mirrored surfaces such that the light that impinges onto first imaging sensor 14 includes the entire spectrum of visible light. Similarly, the light that passes through transmission sectors 112 and 116 and impinges onto second imaging sensor 16 also includes the entire spectrum of visible light.

Figure 8:
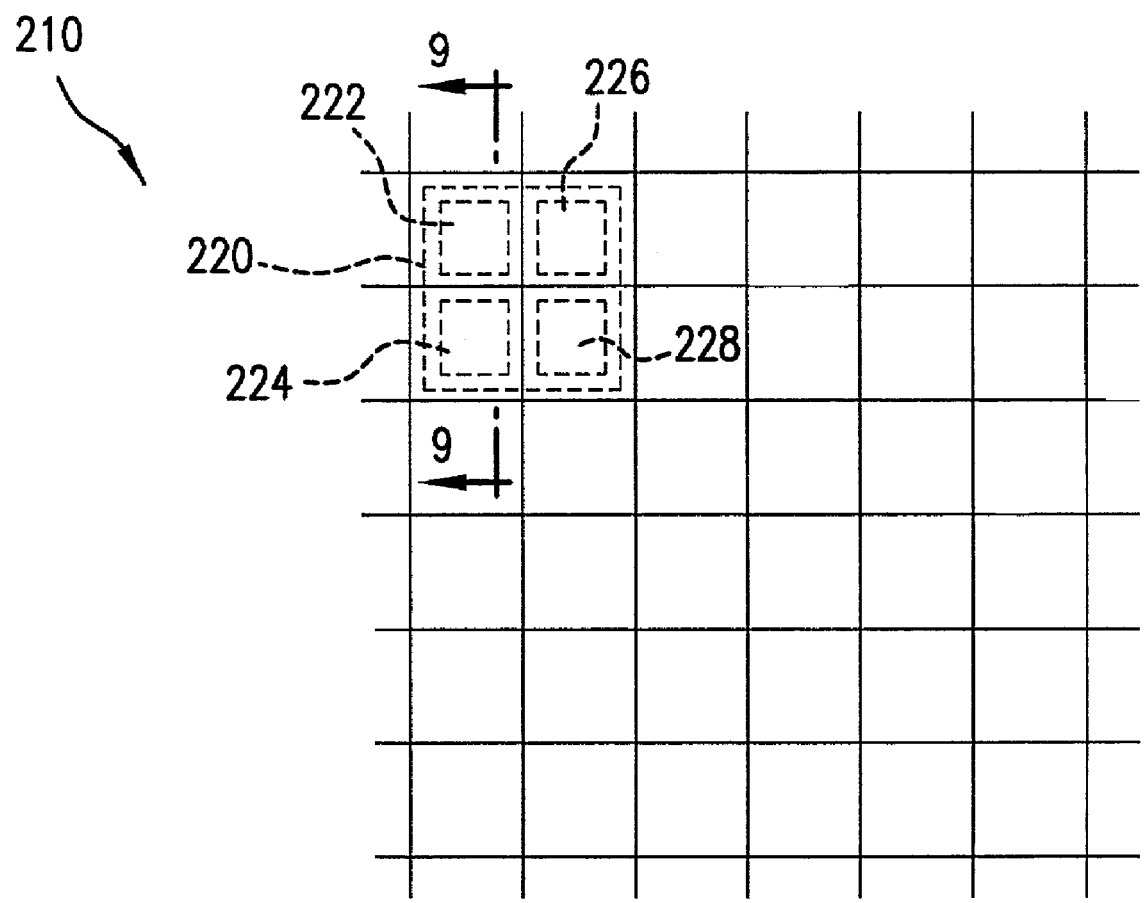
FIG. 8 is a illustration of a imaging sensor pixel array.

In this embodiment, either first imaging sensor 14 or second imaging sensor 16 includes an array 210 of pixel groups 220, as seen in FIG. 8. First pixel group 220 includes a plurality of pixels, e.g., pixels 222, 224, 226, 228. The pixels are arranged to image a variety of colors by overlaying the pixels with color-specific microfilters, for example, pixel 222 may image the color red with pixel 224 imaging the color blue while pixels 226 and 228 image the color green. The plural pixels of first pixel group 220 include first pixel 222 and first pixel 222 is overlaid with first color microfilter 232 (FIG. 9), thus allowing the imaging sensor to image a particular color.

In a variation of this embodiment, the plural pixels of first pixel group 220 further include second pixel 224 and second pixel 224 is overlaid with second color microfilter 234, thus allowing the imaging sensor to image two colors at once. In a further variation of this embodiment, the plural pixels of first pixel group 220 further include third pixel 226 or 228 and third pixel 226 or 228 is overlaid with a third color microfilter, e.g., microfilter 232 or 234, thus allowing the imaging sensor to image three colors at once. Those of ordinary skill in the art will appreciate that overlaying two pixels, e.g., pixels 226 and 228, with microfilters of the same color may be desirable to improve the response of the imaging sensor to that particular color.

In the situation where, for example, second imaging sensor 16 includes array 210 of pixel groups 220, second imaging sensor 16 is able to image multiple colors, as described previously. Thus, if second imaging sensor 16 is imaging two colors by employing a two-pixel group, each pixel overlaid with a different color microfilter (e.g., red and blue), first imaging sensor 14 need image only the remaining color (e.g., green). Color selection for first imaging sensor 14 may be accomplished using first color filter 18 disposed along reflected axis 28 between rotatable structure 100 and first imaging sensor 14. Alternatively, where, for example, first imaging sensor 14 includes array 210 of pixel groups 220, thus allowing first imaging sensor 14 to image multiple colors, second imaging sensor 16 need image only the single, remaining color. Color selection for second imaging sensor 16 may be accomplished using second color filter 20 disposed along direct axis 26 between rotatable structure 100 and second imaging sensor 16.

In another embodiment, rather than using external color filters 18 and 20 to perform single color selection, a color selective coating may be employed to achieve the same result. For instance, when second imaging sensor 16 includes array 210 of pixel groups 220 and is imaging two colors, reflection sectors 114 and 118 may be coated with a color selective coating (such coatings as are known in the optics art and are commonly used in high quality photography cameras) to provide the remaining color to first imaging sensor 14, as shown in FIGS. 10 and 11.

Figure 10:
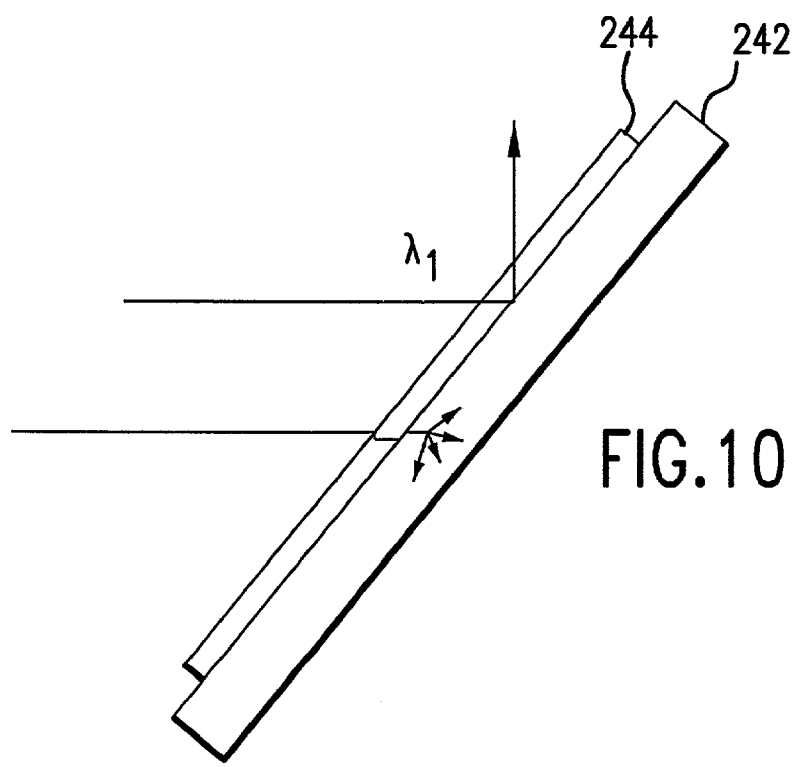
FIG. 10 is an illustration of an opaque reflection sector coated with a color selective coating.
Figure 11:
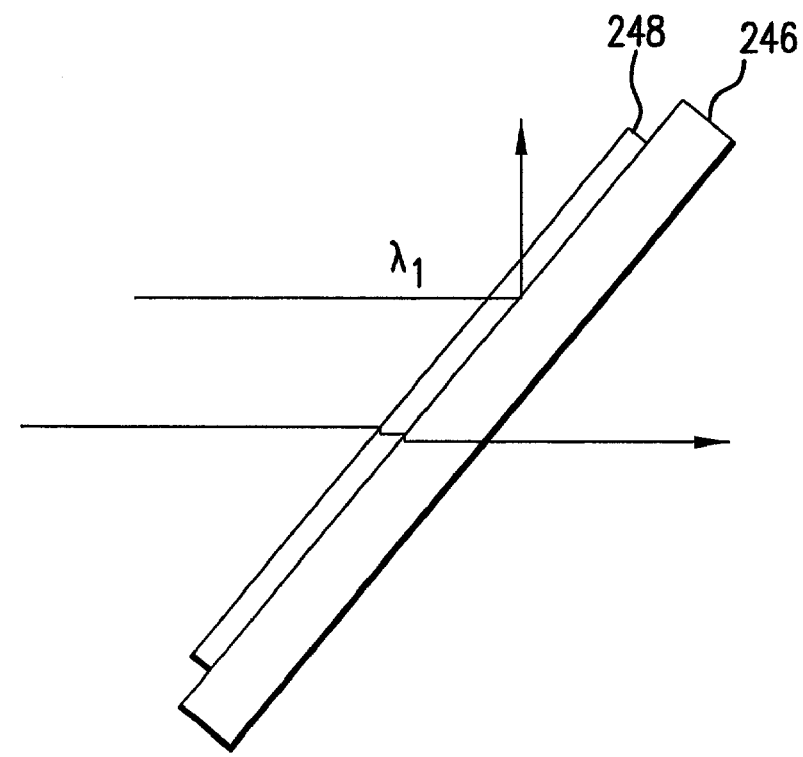
FIG. 11 is an illustration of a transparent reflection sector coated with a color selective coating.

In FIG. 10, reflection sector 242 is formed from an opaque material, such that no light is transmitted through reflection sector 242, and is coated with color selective coating 244. Color selective coating 244 selects a desired wavelength, i.e., $\lambda 1$, from the all-band visible light spectrum that impinges on reflection sector 242 and allows only the selected, desired wavelength to be reflected onto first imaging sensor 14. Non-selected wavelengths are absorbed by the opaque material. In an alternative embodiment, as illustrated in FIG. 11, reflection sector 246 is formed from a transparent material and color selective coating 248 allows all wavelengths except for the desired wavelength to be transmitted through the transparent material of reflection sector 246. The desired wavelength, $\lambda 1$, is reflected onto first imaging sensor 14. In this case, second imaging sensor 16 is operated so that no photocharge is being accumulated while reflection sector 246 is in the direct optical path between lens 12 and second imaging sensor 16. This is commonly done using exposure control gates or by resetting the sensor just before an image is to be collected.

Figure 12:
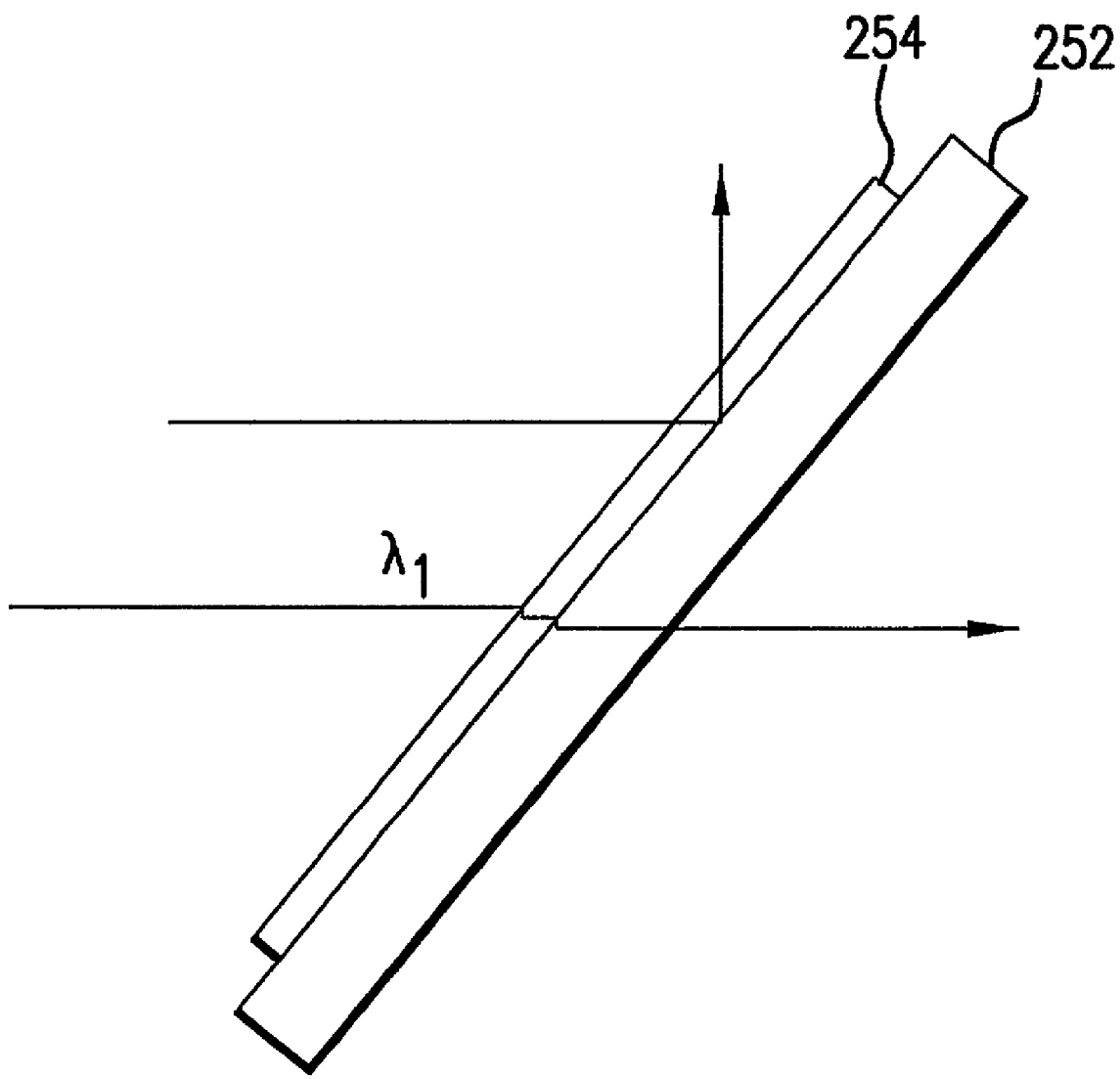
FIG. 12 is an illustration of a transmission sector coated with a color selective coating.

FIG. 12 illustrates the situation where first imaging sensor 14 includes array 210 of pixel groups 220 and is thus imaging multiple colors. In this case, second imaging sensor 16 need only image one color, thus, transmission sector 252 is coated with a color selective coating. Transmission sector 252 is formed of a transparent material and is coated with color selective coating 254. Color selective coating 254 selects the desired wavelength, i.e., $\lambda 1$, from the all-band visible light spectrum that impinges on transmission sector 252 and allows only the selected, desired wavelength to be transmitted onto second imaging sensor 16. Non-selected wavelengths are reflected away from transmission sector 252 and towards first imaging sensor 14 that is operated so that no photocharge is being accumulated while transmission sector 252 is in the direct optical path between lens 12 and second imaging sensor 16.

As described previously with reference to camera 10 (FIG. 1), first imaging sensor 14 is disposed to image light that propagates along reflected axis 28 and second imaging sensor 16 is disposed to image light that propagates along direct axis 26. First structure 110 (FIG. 2), which serves as rotatable structure 100, includes first and second transmission sectors 112 and 116 and first and second reflection sectors 114 and 118. In operation, the light that propagates along reflected axis 28 is reflected from at least one of reflection sectors 114 and 118 and the light that propagates along direct axis 26 passes through at least one of transmission sectors 112 and 116. In one embodiment, first reflection sector 114 is coated with a first reflection color selective coating, while in another embodiment, first transmission sector 114 is coated with a first transmission color selective coating, where the reflection and transmission color selective coatings select specific color wavelengths, as described previously (FIGS. 10–12).

In the former embodiment, where first reflection sector 114 is coated with the first reflection color selective coating, second reflection sector is coated with a second reflection color selective coating. Additionally, second color filter 20 may be disposed along direct axis 26 between rotatable structure 100 and second imaging sensor 16. This variation allows camera 10 to image the requisite three colors since first reflection sector 114 reflects a first color (e.g., red), second reflection sector 118 reflects a second color (e.g., blue), and second color filter 20 selects a third color (e.g., green) from the light that passes through transmission sectors 112 and 116. In a further variation of this embodiment, transmission sectors 112 and 116 are coated with a transmission color selective coating that selects the third color and obviates the need for external second color filter 20.

In the latter embodiment, where first transmission sector 112 is coated with the first transmission color selective coating, second transmission sector 116 is coated with a second transmission color selective coating. Additionally, first color filter 18 may be disposed along reflected axis 28 between rotatable structure 100 and first imaging sensor 14. This variation allows camera 10 to image the requisite three colors since first transmission sector 112 transmits a first color (e.g., red), second transmission sector 116 transmits a second color (e.g., blue), and first color filter 18 selects a third color (e.g., green) from the light that reflects from reflection sectors 114 and 118. In a further variation of this embodiment, reflection sectors 114 and 118 are coated with a reflection color selective coating that selects the third color and obviates the need for external first color filter 18.

In another embodiment, both first reflection sector 114 and first transmission sector 112 are coated with color selective coatings, with first reflection sector 114 being coated with the first reflection color selective coating and first transmission sector 112 being coated with the first transmission color selective coating. In one variation on this embodiment, second transmission sector 116 is also coated with the first transmission color selective coating, thus allowing only one color to impinge on second imaging sensor 16. In another variation, second reflection sector 118 is also coated with the first reflection color selective coating, thus allowing only one color to impinge on first imaging sensor 14.

In a further embodiment, second color filter 20 is disposed along direct axis 26 between rotatable structure 100 and second imaging sensor 16 when first reflection sector 114 is coated with the first reflection color selective coating. Alternatively, first color filter 18 is disposed along reflected axis 28 between rotatable structure 100 and first imaging sensor 14 when first transmission sector 112 is coated with the first transmission color selective coating.

Figure 20A:
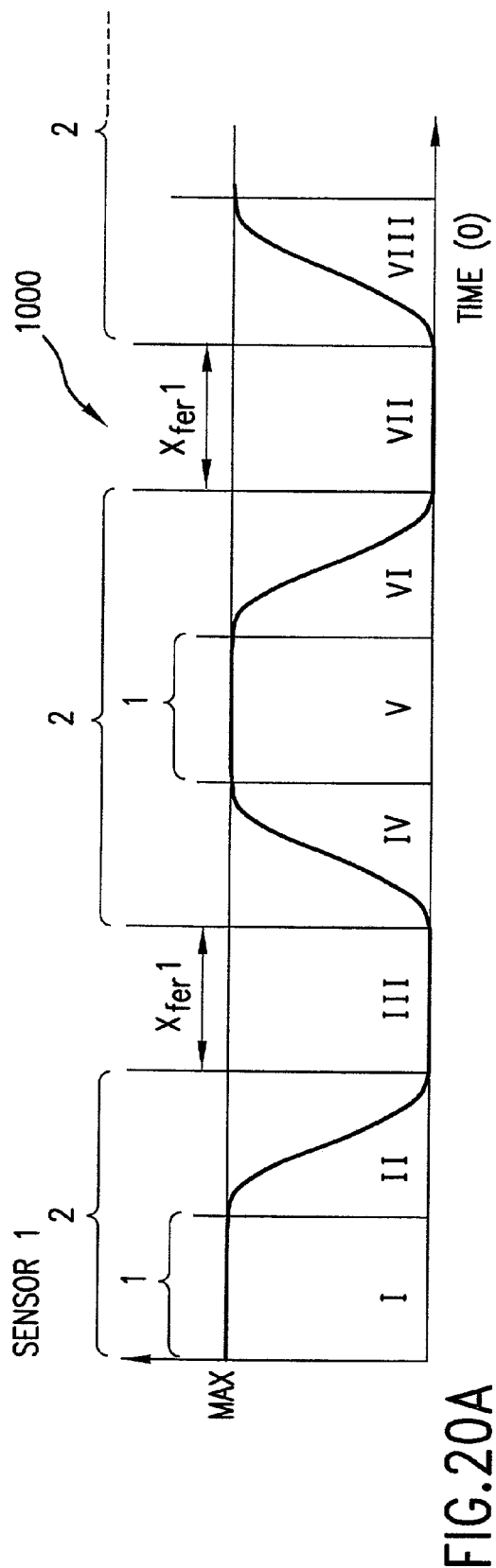
FIGS. 20A and 20B are timing diagrams of the operation of the first embodiment of the rotatable structure.
Figure 20B:
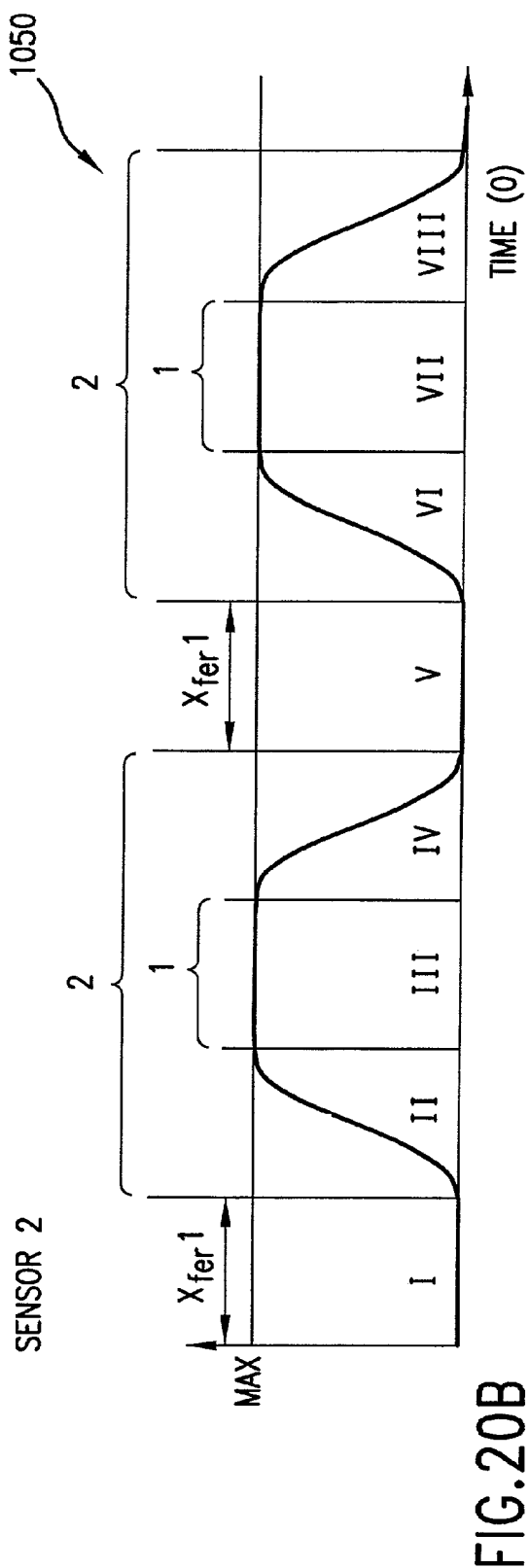

FIGS. 20A and 20B illustrate timing diagrams for the operation of first rotatable structure 110. Timing for the operation of first imaging sensor 14 is denoted generally by reference numeral 1000 (FIG. 20A) and timing for the operation of second imaging sensor 16 is denoted generally by reference numeral 1050 (FIG. 20B). The operation of first rotatable structure 110 is separated into eight regions (denoted by Roman numerals I–VIII) that correspond to the sectors of first rotatable structure 110. The vertical axes in timing diagrams 1000 and 1050 represents the number of pixels illuminated in first and second imaging sensors 14 and 16, respectively. The horizontal axes represents the time, or phase, of the rotation of first rotatable structure 110.

Region I in timing diagram 1000 shows the charge integration in first imaging sensor 14 while the image light reflects from a central area of first reflection sector 114 such that every pixel on first imaging sensor 14 is illuminated. Charge is integrated in first imaging sensor 14 while the image light reflects from first reflection sector 114 onto first imaging sensor 14. As first rotatable structure 110 rotates, first reflection sector 114 moves out of the objective path of lens 12 while first transmission sector 112 moves into the objective path of lens 12. Fewer pixels of first imaging sensor 14 are illuminated, as shown by region II in timing diagram 1000. In one embodiment, charge integrates in first imaging sensor 14 only while first imaging sensor 14 is fully illuminated (bracket 1). In an alternative embodiment, charge integration in first imaging sensor 14 begins as first reflection sector 114 moves into the objective path of lens 12 and continues as first reflection sector 114 moves out of the objective path of lens 12 and fewer pixels in first imaging sensor 14 are illuminated (bracket 2).

Once first transmission sector 112 has moved completely into the objective path of lens 12, the image light no longer reflects onto first imaging sensor 14, as shown by region III in timing diagram 1000. Charge is transferred (Xfer 1) from first imaging sensor 14 while first transmission sector 112 prevents the image light from impinging on first imaging sensor 14. The cycle of charge integration in first imaging sensor 14 is repeated as second reflection sector 118 moves into and out of the objective path of lens 12 and the image light reflects from second reflection sector 118 onto first imaging sensor 14 (regions IV–VI). Charge is again transferred from first imaging sensor 14 once second transmission sector 116 is completely in the objective path of lens 12, thus preventing the image light from impinging on first imaging sensor 14 (region VII). The cycle begins anew as first reflection sector 114 moves back into the objective path of lens 12 (region VIII).

Similarly for second imaging sensor 16, timing diagram 1050 shows the charge integration in second imaging sensor 16 while the image light passes through an increasing portion of first transmission sector 112 (region II) until the image light passes through a central area of first transmission sector 112 such that every pixel on second imaging sensor 16 is illuminated (region III). Charge is integrated in second imaging sensor 16 while the image light passes through first transmission sector 112 onto second imaging sensor 16. As first rotatable structure 110 rotates, first transmission sector 112 moves out of the objective path of lens 12 while second reflection sector 118 moves into the objective path of lens 12. Fewer pixels of second imaging sensor 16 are illuminated, as shown by region IV in timing diagram 1050. In one embodiment, charge integrates in second imaging sensor 16 only while second imaging sensor 16 is fully illuminated (bracket 1). In an alternative embodiment, charge integration in second imaging sensor 16 begins as first transmission sector 112 moves into the objective path of lens 12 and continues as first transmission sector 112 moves out of the objective path of lens 12 (region IV) and fewer pixels in second imaging sensor 16 are illuminated (bracket 2).

Once second reflection sector 118 has moved completely into the objective path of lens 12, the image light no longer reflects onto second imaging sensor 16 (region V). Charge is transferred (Xfer 1) from second imaging sensor 16 while second reflection sector 118 prevents the image light from impinging on second imaging sensor 16. The cycle of charge integration in second imaging sensor 16 is repeated as second transmission sector 116 moves into and out of the objective path of lens 12 and the image light passes through second transmission sector 116 onto second imaging sensor 16 (regions VI–VIII). Charge is again transferred from second imaging sensor 16 once first reflection sector 114 is completely in the objective path of lens 12, thus preventing the image light from impinging on second imaging sensor 16 (region I). The cycle begins anew as first transmission sector 112 moves back into the objective path of lens 12 (region II).

If first and second reflection sectors 114 and 118 are not completely reflective and if first and second transmission sectors 112 and 116 are not completely transmissive, imaging sensors 14 and 16 are controlled such that neither sensor is capable of integrating charge during the charge transfer phase of their operation. This type of sensor control is called electronic shutter control.

Furthermore, due to the wedge shape of reflection sectors 114 and 118 and transmission sectors 112 and 116, the pixels of imaging sensors 14 and 16 disposed along the outer radius of first rotatable structure 110 will be illuminated for a longer period of time than the pixels disposed along the inner radius of first rotatable structure 110. The resulting image may be adjusted in post-processing to allow for the difference in the amount of charge integrated for different parts of the image. The pixel values can be weighted allow for normalization of the resulting image.

Camera with Mechanical Shutter

With reference to second structure 120 (FIG. 3), in operation, the light that propagates along reflected axis 28 is reflected from first reflection sector 122 and the light that propagates along direct axis 26 passes through first transmission sector 126. In one embodiment, reflection sector 122 is a mirrored surface such that the light that impinges onto first imaging sensor 14 includes the entire spectrum of visible light. Similarly, the light that passes through transmission sector 126 and impinges onto second imaging sensor 16 also includes the entire spectrum of visible light.

In this embodiment, either first imaging sensor 14 or second imaging sensor 16 includes an array 210 of pixel groups, as described previously with reference to FIG. 8. First pixel group 220 includes a plurality of pixels, e.g., pixels 222, 224, 226, 228, that are arranged to image a variety of colors by overlaying the pixels with color-specific microfilters. The plural pixels of first pixel group 220 include first pixel 222 and first pixel 222 is overlaid with first color microfilter 232 (FIG. 9), thus allowing the imaging sensor to image a particular color.

In a variation of this embodiment, the plural pixels of first pixel group 220 further include second pixel 224 and second pixel 224 is overlaid with second color microfilter 234, thus allowing the imaging sensor to image two colors at once. In a further variation of this embodiment, the plural pixels of first pixel group 220 further include third pixel 226 or 228 and third pixel 226 or 228 is overlaid with a third color microfilter, e.g., microfilter 232 or 234, thus allowing the imaging sensor to image three colors at once. Those of ordinary skill in the art will appreciate that overlaying two pixels, e.g., pixels 226 and 228, with microfilters of the same color may be desirable to improve the response of the imaging sensor to that particular color.

In the situation where, for example, second imaging sensor 16 includes array 210 of pixel groups 220, second imaging sensor 16 is able to image multiple colors, as described previously. Thus, if second imaging sensor 16 is imaging two colors by employing a two-pixel group, each pixel overlaid with a different color microfilter (e.g., red and blue), first imaging sensor 14 need image only the remaining color (e.g., green). Color selection for first imaging sensor 14 may be accomplished using first color filter 18 disposed along reflected axis 28 between rotatable structure 100 and first imaging sensor 14. Alternatively, where, for example, first imaging sensor 14 includes array 210 of pixel groups 220, thus allowing first imaging sensor 14 to image multiple colors, second imaging sensor 16 need image only the single, remaining color. Color selection for second imaging sensor 16 may be accomplished using second color filter 20 disposed along direct axis 26 between rotatable structure 100 and second imaging sensor 16.

In another embodiment, rather than using external color filters 18 and 20 to perform single color selection, a color selective coating may be employed to achieve the same result. For instance, when second imaging sensor 16 includes array 210 of pixel groups 220 and is imaging two colors, reflection sector 122 may be coated with a color selective coating to provide the remaining color to first imaging sensor 14 (FIGS. 10 and 11). In the alternative, when first imaging sensor 14 includes array 210 of pixel groups 220, first transmission sector 126 is coated with a color selective coating to provide the remaining color to second imaging sensor 16 (FIG. 12).

As described previously with reference to camera 10 (FIG. 1), first imaging sensor 14 is disposed to image light that propagates along reflected axis 28 and second imaging sensor 16 is disposed to image light that propagates along direct axis 26. Second structure 120 (FIG. 3), which serves as rotatable structure 100, includes first reflection sector 122, first opaque sector 124, and first transmission sector 126. In operation, the light that propagates along reflected axis 28 is reflected from first reflection sectors 122 and the light that propagates along direct axis 26 passes through first transmission sector 126. In one embodiment, first reflection sector 122 is coated with a first reflection color selective coating, while in another embodiment, first transmission sector 126 is coated with a first transmission color selective coating, where the reflection and transmission color selective coatings select specific color wavelengths, as described previously (FIGS. 10–12).

Figure 9:
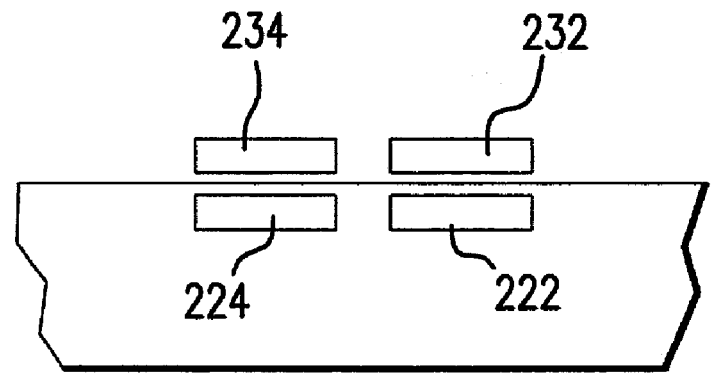
FIG. 9 is an illustration of pixels overlaid with color microfilters.

In the former embodiment, where first transmission sector 126 is coated with the first transmission color selective coating, first imaging sensor 14 includes array 210 of pixel groups 220 (FIG. 8). In the latter embodiment, where first reflection sector 122 is coated with the first reflection color selective coating, second imaging sensor 16 includes array 210 of pixel groups 220 (FIG. 8). In either embodiment, first pixel group 220 includes a plurality of pixels, e.g., pixels 222, 224, 226, 228, that are arranged to image a variety of colors by overlaying the pixels with color-specific microfilters. In these embodiments, the imaging sensor is imaging two particular colors, therefore the plural pixels of first pixel group 220 includes first pixel 222 that is overlaid with first color microfilter 232 and second pixel 224 that is overlaid with second color microfilter 234 (FIG. 9). In a variation of these embodiments, the plural pixels of first pixel group 220 further include a third pixel, pixel 226 or 228, that is overlaid with a third color microfilter (e.g., 232 or 234), thus allowing the imaging sensor to image a third color.

Figure 21A:
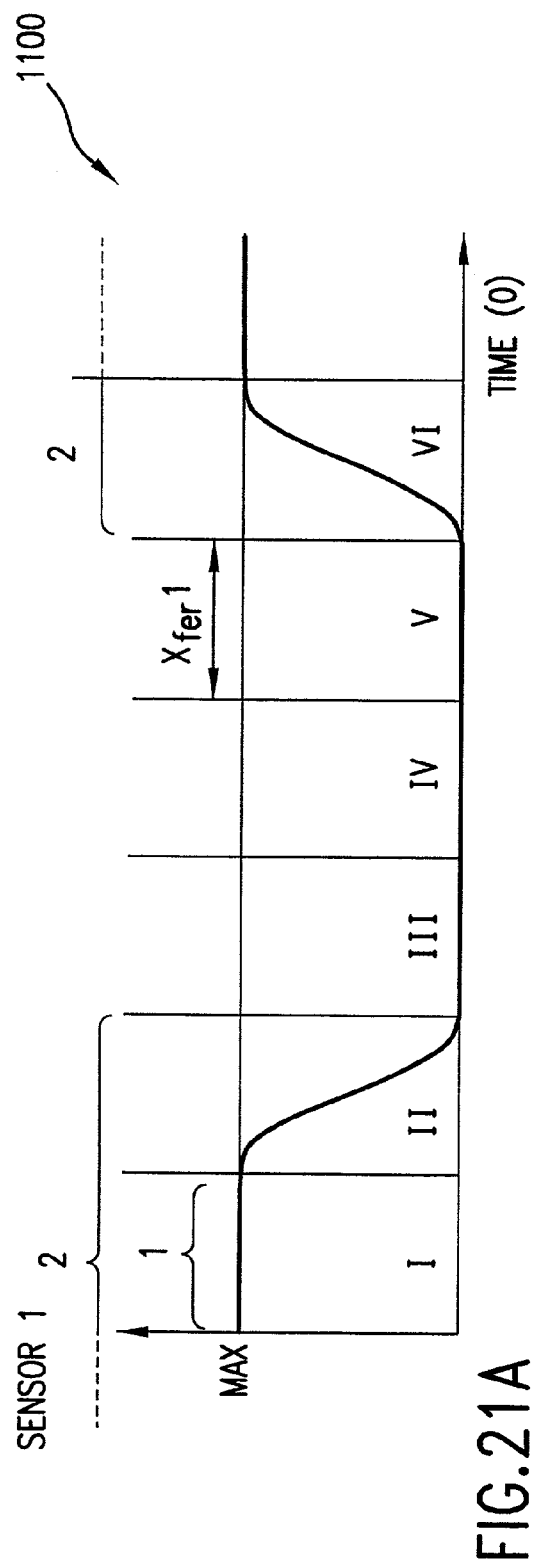
FIGS. 21A and 21B are timing diagrams of the operation of the second embodiment of the rotatable structure.
Figure 21B:
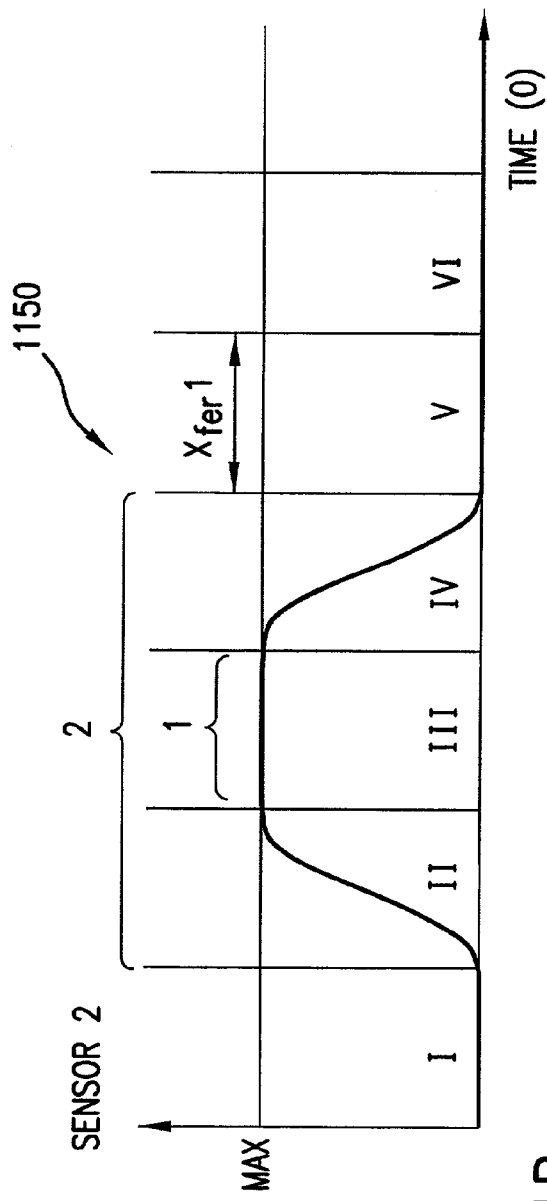

FIGS. 21A and 21B illustrate timing diagrams for one embodiment of the operation of second rotatable structure 120. Timing for the operation of first imaging sensor 14 is denoted generally by reference numeral 1100 (FIG. 21A) and timing for the operation of second imaging sensor 16 is denoted generally by reference numeral 1150 (FIG. 21B). The operation of second rotatable structure 120 is separated into six regions (denoted by Roman numerals I–VI) that correspond to the sectors of second rotatable structure 120. The vertical axes in timing diagrams 1100 and 1150 represents the number of pixels illuminated in first and second imaging sensors 14 and 16, respectively. The horizontal axes represents the time, or phase, of the rotation of second rotatable structure 120.

Region I in timing diagram 1100 shows the charge integration in first imaging sensor 14 while the image light reflects from a central area of first reflection sector 122 such that every pixel on first imaging sensor 14 is illuminated. Charge is integrated in first imaging sensor 14 while the image light reflects from first reflection sector 122 onto first imaging sensor 14. As second rotatable structure 120 rotates, first reflection sector 122 moves out of the objective path of lens 12 while first transmission sector 126 moves into the objective path of lens 12. Fewer pixels of first imaging sensor 14 are illuminated, as shown by region II in timing diagram 1100. In one embodiment, charge integrates in first imaging sensor 14 only while first imaging sensor 14 is fully illuminated (bracket 1). In an alternative embodiment, charge integration in first imaging sensor 14 begins as first reflection sector 122 moves into the objective path of lens 12 and continues as first reflection sector 122 moves out of the objective path of lens 12 and fewer pixels in first imaging sensor 14 are illuminated (bracket 2).

Similarly for second imaging sensor 16, timing diagram 1150 shows the charge integration in second imaging sensor 16 while the image light passes through an increasing portion of first transmission sector 126 (region II) until the image light passes through a central area of first transmission sector 126 such that every pixel on second imaging sensor 16 is illuminated (region III). Charge is integrated in second imaging sensor 16 while the image light passes through first transmission sector 126 onto second imaging sensor 16. As second rotatable structure 120 rotates, first transmission sector 126 moves out of the objective path of lens 12 while first opaque sector 124 moves into the objective path of lens 12. Fewer pixels of second imaging sensor 16 are illuminated, as shown by region IV in timing diagram 1150. In one embodiment, charge integrates in second imaging sensor 16 only while second imaging sensor 16 is fully illuminated (bracket 1). In an alternative embodiment, charge integration in second imaging sensor 16 begins as first transmission sector 126 moves into the objective path of lens 12 and continues as first transmission sector 126 moves out of the objective path of lens 12 and fewer pixels in second imaging sensor 16 are illuminated (bracket 2).

Once first opaque sector 124 has moved completely into the objective path of lens 12, the image light no longer reflects onto first and second imaging sensors 14 and 16, as shown by region V in timing diagram 1150. Charge is transferred (Xfer 1) from both first and second imaging sensors 14 and 16 while first opaque sector 124 prevents the image light from impinging on the imaging sensors 14 and 16. The entire cycle begins anew as first reflection sector 122 moves back into the objective path of lens 12, as shown in region VI in timing diagram 1100.

Since first opaque sector 124 is formed of absorbing material, first opaque sector 124 acts as a light shield under which the imaging sensors 14 and 16 can transfer charge without smear. First opaque sector 124 acts as a mechanical shutter, thus allowing the imaging sensors 14 and 16 to be full-frame transfer type sensors that lack electronic shutter capabilities. Furthermore, as discussed previously, the wedge shape of first reflection sector 122 and first transmission sector 126 necessitates the adjustment of the resulting image either in post-processing or by using weighted pixel values.

Figure 22A:
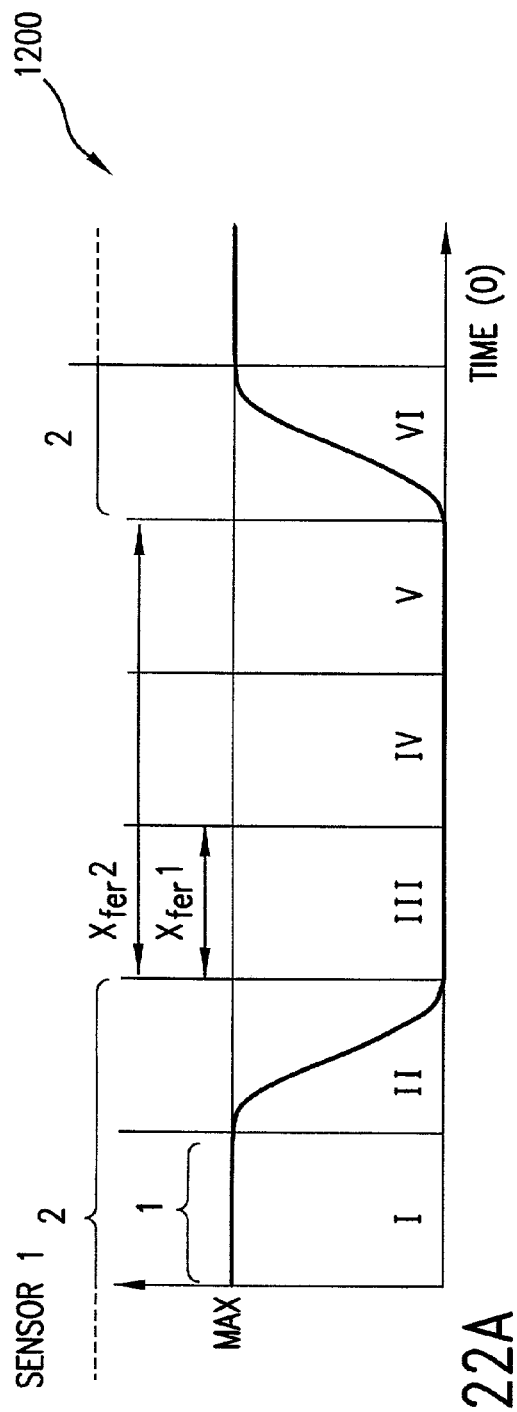
FIGS. 22A and 22B are timing diagrams of an alternative operation of the second embodiment of the rotatable structure.
Figure 22B:
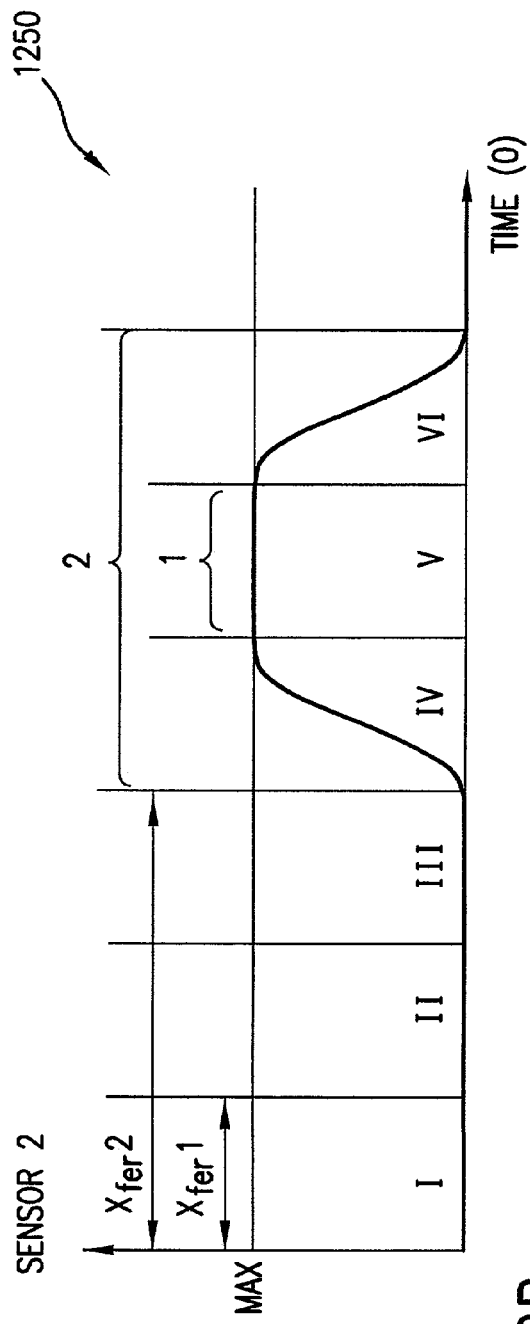

FIGS. 22A and 22B illustrate timing diagrams for another embodiment of the operation of second rotatable structure 120. Timing for the operation of first imaging sensor 14 is denoted generally by reference numeral 1200 (FIG. 22A) and timing for the operation of second imaging sensor 16 is denoted generally by reference numeral 1250 (FIG. 22B). The operation of second rotatable structure 120 is separated into six regions (denoted by Roman numerals I–VI) that correspond to the sectors of second rotatable structure 120. The vertical axes in timing diagrams 1200 and 1250 represents the number of pixels illuminated in first and second imaging sensors 14 and 16, respectively. The horizontal axes represents the time, or phase, of the rotation of second rotatable structure 120.

Region I in timing diagram 1200 shows the charge integration in first imaging sensor 14 while the image light reflects from a central area of first reflection sector 122 such that every pixel on first imaging sensor 14 is illuminated. Charge is integrated in first imaging sensor 14 while the image light reflects from first reflection sector 122 onto first imaging sensor 14. As second rotatable structure 120 rotates, first reflection sector 122 moves out of the objective path of lens 12 while first opaque sector 124 moves into the objective path of lens 12. Fewer pixels of first imaging sensor 14 are illuminated, as shown by region II in timing diagram 1200. In one embodiment, charge integrates in first imaging sensor 14 only while first imaging sensor 14 is fully illuminated (bracket 1). In an alternative embodiment, charge integration in first imaging sensor 14 begins as first reflection sector 122 moves into the objective path of lens 12 and continues as first reflection sector 122 moves out of the objective path of lens 12 and fewer pixels in first imaging sensor 14 are illuminated (bracket 2).

Once first opaque sector 124 has moved completely into the objective path of lens 12, the image light no longer reflects onto first imaging sensor 14, as shown by region III in timing diagram 1200. Charge is transferred (Xfer 1) from first imaging sensor 14 while first opaque sector 124 prevents the image light from impinging on first imaging sensor 14. Alternatively, since light does not again impinge on first imaging 14 until first reflection sector 122 moves back into the objective path of lens 12 (region VI), first imaging sensor 14 has a longer charge transfer cycle (Xfer 2), thus allowing first imaging sensor 14 to be a less expensive, lower speed sensor.

Similarly for second imaging sensor 16, timing diagram 1250 shows the charge integration in second imaging sensor 16 while the image light passes through an increasing portion of first transmission sector 126 (region IV) until the image light passes through a central area of first transmission sector 126 such that every pixel on second imaging sensor 16 is illuminated (region V). Charge is integrated in second imaging sensor 16 while the image light passes through first transmission sector 126 onto second imaging sensor 16. As second rotatable structure 120 rotates, first transmission sector 126 moves out of the objective path of lens 12 while first reflection sector 122 moves into the objective path of lens 12. Fewer pixels of second imaging sensor 16 are illuminated, as shown by region VI in timing diagram 1250. In one embodiment, charge integrates in second imaging sensor 16 only while second imaging sensor 16 is fully illuminated (bracket 1). In an alternative embodiment, charge integration in second imaging sensor 16 begins as first transmission sector 126 moves into the objective path of lens 12 and continues as first transmission sector 126 moves out of the objective path of lens 12 and fewer pixels in second imaging sensor 16 are illuminated (bracket 2).

Once first reflection sector 122 has moved completely into the objective path of lens 12, the image light no longer reflects onto second imaging sensor 16, as shown by region I in timing diagram 1250. Charge is transferred (Xfer 1) from second imaging sensor 16 while first reflection sector 122 prevents the image light from impinging on second imaging sensor 16. Alternatively, since light does not again impinge on second imaging 16 until first transmission sector 126 moves back into the objective path of lens 12 (region IV), second imaging sensor 16 has a longer charge transfer cycle (Xfer 2), thus allowing second imaging sensor 16 to be a less expensive, lower speed sensor. The entire cycle begins anew with charge integration in first imaging sensor 14 as first reflection sector 122 moves back into the objective path of lens 12, as shown in region VI in timing diagram 1200.

Since first opaque sector 124 is formed of absorbing material, first opaque sector 124 acts as a light shield under which second imaging sensor 16 can transfer charge without smear. In this embodiment, first reflection sector 122 is made of material that prevents any transmission of image light onto second imaging sensor 16 while first reflection sector 122 is in the objective path of lens 12. Therefore both first opaque sector 124 and first reflection sector 122 act as mechanical shutters, thus allowing the imaging sensors 14 and 16 to be full-frame transfer type sensors that lack electronic shutter capabilities. Furthermore, as discussed previously, the wedge shape of first reflection sector 122 and first transmission sector 126 necessitates the adjustment of the resulting image either in post-processing or by using weighted pixel values.

Figure 4:
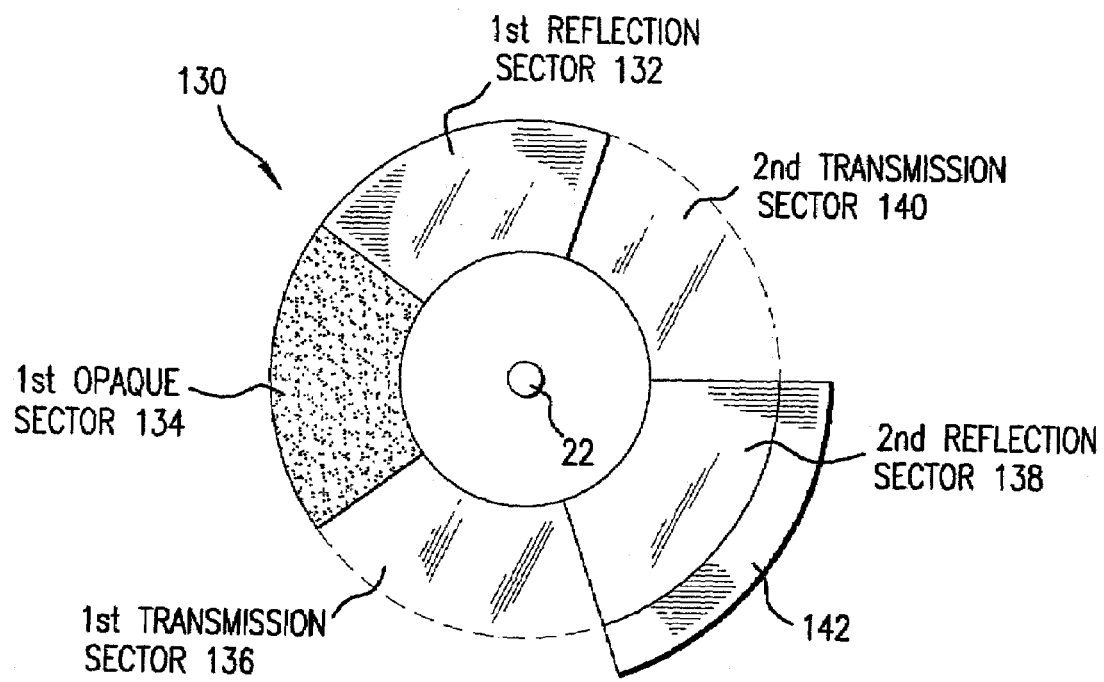
FIG. 4 is a schematic diagram of a third embodiment of the rotatable structure.

In FIG. 4, third structure 130 is a variation of second structure 120 that further includes second reflection sector 138 disposed adjacent to first transmission sector 136 and second transmission sector 140 disposed adjacent to second reflection sector 138. Third structure 130 may also include counterweight 142, which serves to offset the mass distribution differential caused by transmission sectors 136 and 140 when transmission sectors 136 and 140 are air-filled gaps, thus preserving dynamic balance in third structure 130. As noted previously, the dynamic balancing function of third structure 130 may be achieved by other means, for example, relocating the placement of axle attachment point 22 to create a dynamically balanced rotatable structure. In some embodiments, each sector subtends one-fifth of a circle. Other embodiments may vary as described further herein.

In one embodiment, first reflection sector 132 is coated with a first reflection color selective coating, while in another embodiment, first transmission sector 136 is coated with a first transmission color selective coating, where the reflection and transmission color selective coatings select specific color wavelengths, as described previously (FIGS. 10–12). In the former embodiment, where first reflection sector 132 is coated with the first reflection color selective coating, second reflection sector 142 is coated with a second reflection color selective coating. Additionally, second color filter 20 may be disposed along direct axis 26 between rotatable structure 100 and second imaging sensor 16. This variation allows camera 10 to image the requisite three colors since first reflection sector 132 reflects a first color (e.g., red), second reflection sector 138 reflects a second color (e.g., blue), and second color filter 20 selects a third color (e.g., green) from the light that passes through transmission sectors 136 and 140. In a further variation of this embodiment, transmission sectors 136 and 140 are coated with a transmission color selective coating that selects the third color and obviates the need for external second color filter 20.

In the latter embodiment, where first transmission sector 136 is coated with the first transmission color selective coating, second transmission sector 140 is coated with a second transmission color selective coating. Additionally, first color filter 18 may be disposed along the reflected axis between rotatable structure 100 and first imaging sensor 14. This variation allows camera 10 to image the requisite three colors since first transmission sector 136 transmits a first color (e.g., red), second transmission sector 140 transmits a second color (e.g., blue), and first color filter 18 selects a third color (e.g., green) from the light that reflects from reflection sectors 132 and 138. In a further variation of this embodiment, reflection sectors 132 and 138 are coated with a reflection color selective coating that selects the third color and obviates the need for external first color filter 18.

In another embodiment, both first reflection sector 132 and first transmission sector 136 are coated with color selective coatings, with first reflection sector 132 being coated with the first reflection color selective coating and first transmission sector 136 being coated with the first transmission color selective coating. In one variation on this embodiment, second transmission sector 140 is also coated with the first transmission color selective coating, thus allowing only one color to impinge on second imaging sensor 16. In another variation, second reflection sector 138 is also coated with the first reflection color selective coating, thus allowing only one color to impinge on first imaging sensor 14.

In a further embodiment, second color filter 20 is disposed along direct axis 26 between rotatable structure 100 and second imaging sensor 16 when first reflection sector 132 is coated with the first reflection color selective coating. Alternatively, first color filter 18 is disposed along reflected axis 28 between rotatable structure 100 and first imaging 14 sensor when first transmission sector 136 is coated with the first transmission color selective coating.

Figure 23A:
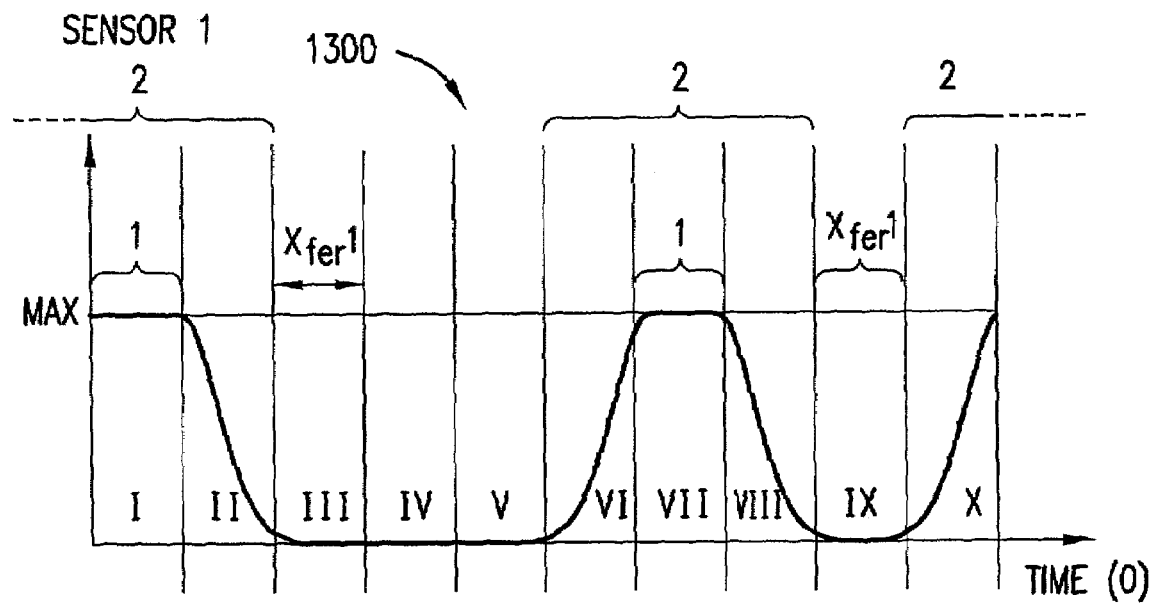
FIGS. 23A and 23B are timing diagrams of the operation of the third embodiment of the rotatable structure.
Figure 23B:
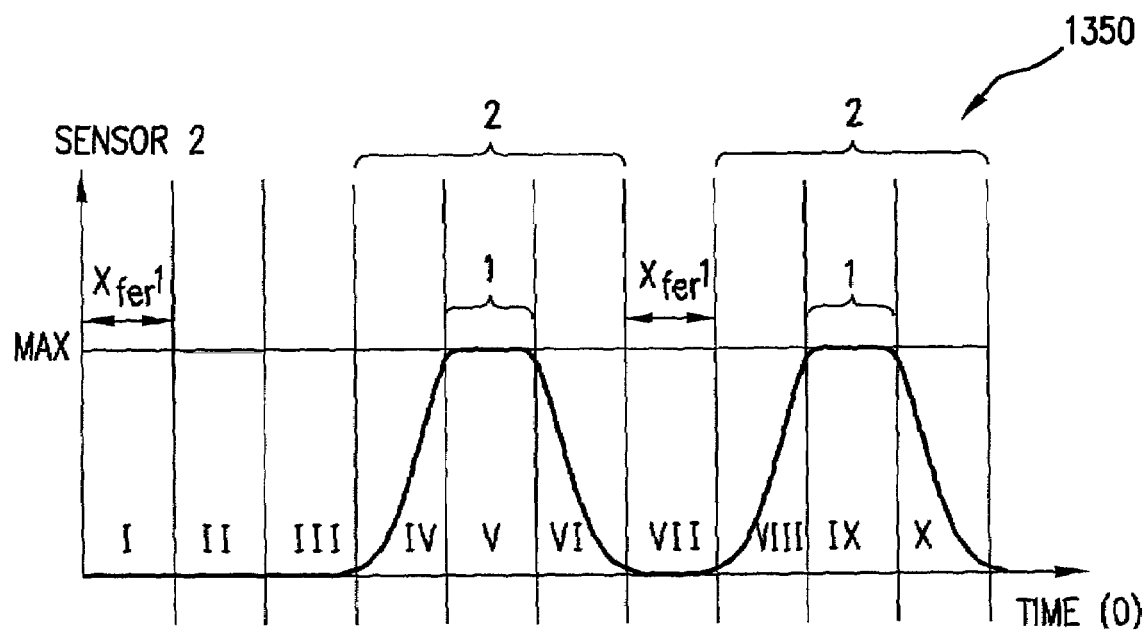

FIGS. 23A and 23B illustrate timing diagrams for the operation of third rotatable structure 130. Timing for the operation of first imaging sensor 14 is denoted generally by reference numeral 1300 (FIG. 23A) and timing for the operation of second imaging sensor 16 is denoted generally by reference numeral 1350 (FIG. 23B). The operation of third rotatable structure 130 is separated into ten regions (denoted by Roman numerals I–X) that correspond to the sectors of third rotatable structure 130. The vertical axes in timing diagrams 1300 and 1350 represents the number of pixels illuminated in first and second imaging sensors 14 and 16, respectively. The horizontal axes represents the time, or phase, of the rotation of third rotatable structure 130.

Region I in timing diagram 1300 shows the charge integration in first imaging sensor 14 while the image light reflects from a central area of first reflection sector 132 such that every pixel on first imaging sensor 14 is illuminated. Charge is integrated in first imaging sensor 14 while the image light reflects from first reflection sector 132 onto first imaging sensor 14. As third rotatable structure 130 rotates, first reflection sector 132 moves out of the objective path of lens 12 while first opaque sector 134 moves into the objective path of lens 12. Fewer pixels of first imaging sensor 14 are illuminated, as shown by region II in timing diagram 1300. In one embodiment, charge integrates in first imaging sensor 14 only while first imaging sensor 14 is fully illuminated (bracket 1). In an alternative embodiment, charge integration in first imaging sensor 14 begins as first reflection sector 132 moves into the objective path of lens 12 and continues as first reflection sector 132 moves out of the objective path of lens 12 and fewer pixels in first imaging sensor 14 are illuminated (bracket 2).

Once first opaque sector 134 has moved completely into the objective path of lens 12, the image light no longer reflects onto first imaging sensor 14, as shown by region III in timing diagram 1300. Charge is transferred (Xfer 1) from first imaging sensor 14 while first opaque sector 134 prevents the image light from impinging on first imaging sensor 14.

Similarly for second imaging sensor 16, timing diagram 1350 shows the charge integration in second imaging sensor 16 while the image light passes through an increasing portion of first transmission sector 136 (region IV) until the image light passes through a central area of first transmission sector 136 such that every pixel on second imaging sensor 16 is illuminated (region V). Charge is integrated in second imaging sensor 16 while the image light passes through first transmission sector 136 onto second imaging sensor 16. As third rotatable structure 130 rotates, first transmission sector 136 moves out of the objective path of lens 12 while second reflection sector 138 moves into the objective path of lens 12. Fewer pixels of second imaging sensor 16 are illuminated, as shown by region VI in timing diagram 1350. In one embodiment, charge integrates in second imaging sensor 16 only while second imaging sensor 16 is fully illuminated (bracket 1). In an alternative embodiment, charge integration in second imaging sensor 16 begins as first transmission sector 136 moves into the objective path of lens 12 and continues as first transmission sector 136 moves out of the objective path of lens 12 and fewer pixels in second imaging sensor 16 are illuminated (bracket 2).

Once second reflection sector 138 has moved completely into the objective path of lens 12, the image light no longer reflects onto second imaging sensor 16, as shown by region VII in timing diagram 1350. Charge is transferred (Xfer 1) from second imaging sensor 16 while first reflection sector 132 prevents the image light from impinging on second imaging sensor 16.

The cycle of charge integration in first imaging sensor 14 is repeated as second reflection sector 138 moves into and out of the objective path of lens 12 and the image light reflects from second reflection sector 138 onto first imaging sensor 14, as shown in regions VI–VIII in timing diagram 1300. Charge is again transferred from first imaging sensor 14 once second transmission sector 140 is completely in the objective path of lens 12, thus preventing the image light from impinging on first imaging sensor 14 (region IX).

The cycle of charge integration in second imaging sensor 16 is repeated as second transmission sector 140 moves into and out of the objective path of lens 12 and the image light passes through second transmission sector 140 onto second imaging sensor 16, as shown in regions VIII–X in timing diagram 1350. Charge is again transferred from second imaging sensor 16 once first reflection sector 132 is completely in the objective path of lens 12, thus preventing the image light from impinging on second imaging sensor 16 (region I). The entire cycle begins anew as first reflection sector 132 moves back into the objective path of lens 12 (region X).

Since first opaque sector 134 is formed of absorbing material, first opaque sector 134 acts as a light shield under which second imaging sensor 16 can transfer charge without smear. In this embodiment, first and second reflection sectors 132 and 138 are made of material that prevents any transmission of image light onto second imaging sensor 16 while the reflection sectors 132 and 138 are in the objective path of lens 12. Therefore both first opaque sector 134 and the reflection sectors 132 and 138 act as mechanical shutters, thus allowing the imaging sensors 14 and 16 to be full-frame transfer type sensors that lack electronic shutter capabilities. Furthermore, as discussed previously, the wedge shape of first reflection sector 132 and first transmission sector 136 necessitates the adjustment of the resulting image either in post-processing or by using weighted pixel values.

Figure 5:
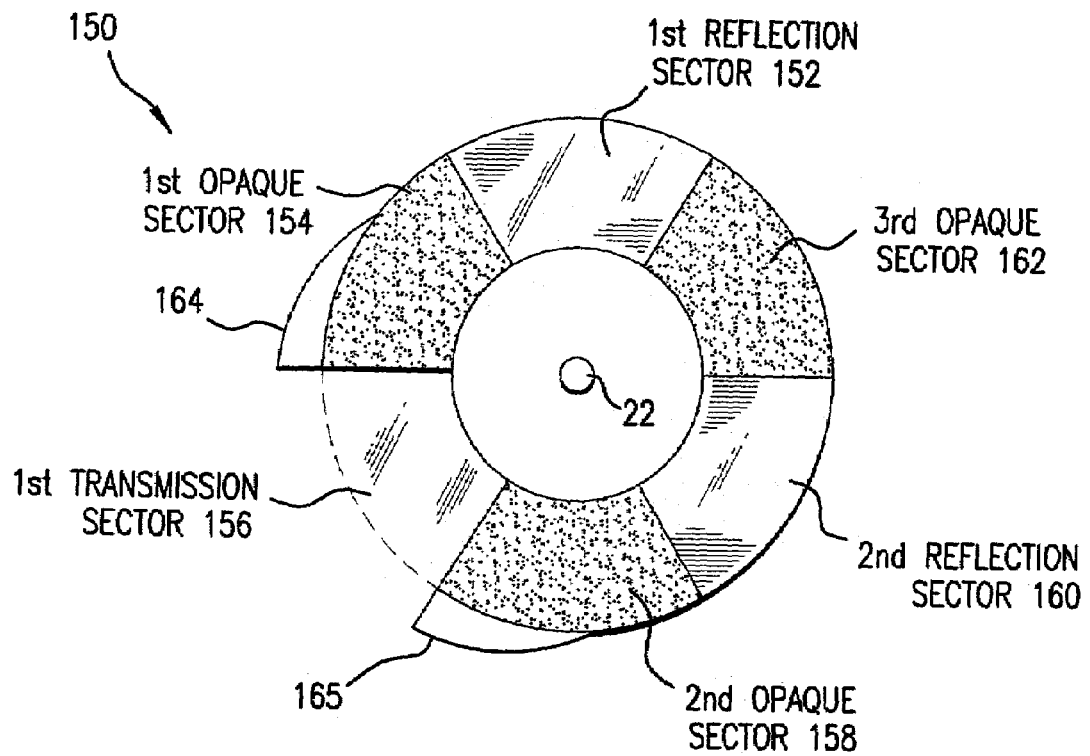
FIG. 5 is a schematic diagram of fourth embodiment of the rotatable structure.

In FIG. 5, fourth structure 150 is another variation of second structure 120 that further includes second opaque sector 158 disposed adjacent to first transmission sector 156, second reflection sector 160 disposed adjacent to second opaque sector 158, and third opaque sector 162 disposed adjacent to second reflection sector 160. Fourth structure 150 may also include counterweights 164 and 165, which serve to offset the mass distribution differential caused by first transmission sector 156 when first transmission sector 156 is an air-filled gap, thus preserving dynamic balance in fourth structure 150. As noted previously, the dynamic balancing function of fourth structure 150 may be achieved by other means, for example, relocating the placement of axle attachment point 22 to create a dynamically balanced rotatable structure. In some embodiments, each sector subtends one-sixth of a circle. Other embodiments may vary as described further herein. In operation, the light that propagates along direct axis 26 passes through first transmission sector 156 and the light that propagates along reflected axis 28 is reflected from reflection sectors 152 and 160.

Figures 24A, 24B:
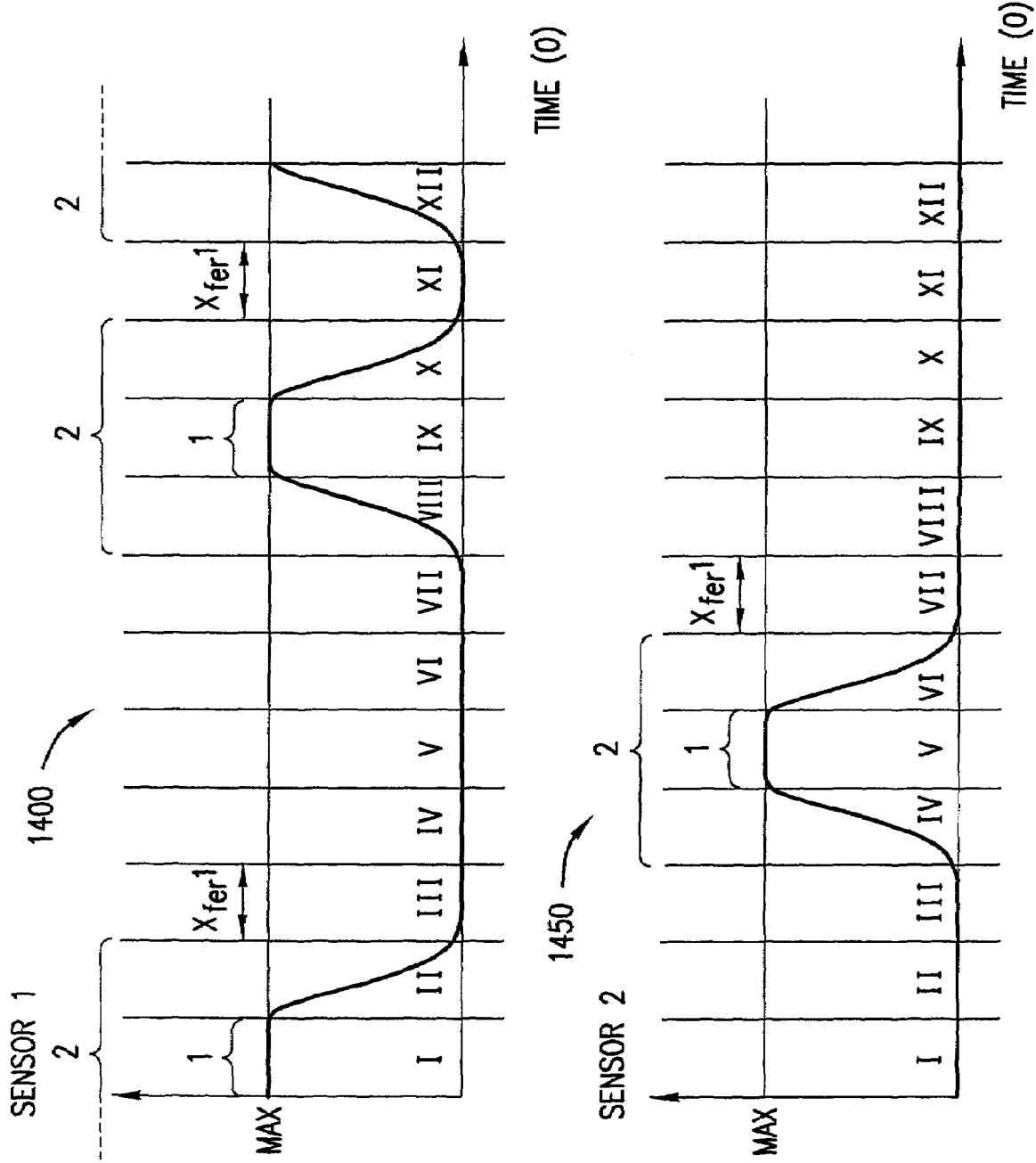
FIGS. 24A and 24B are timing diagrams of the operation of the fourth embodiment of the rotatable structure.

FIGS. 24A and 24B illustrate timing diagrams for the operation of fourth rotatable structure 150. Timing for the operation of first imaging sensor 14 is denoted generally by reference numeral 1400 (FIG. 24A) and timing for the operation of second imaging sensor 16 is denoted generally by reference numeral 1450 (FIG. 24B). The operation of fourth rotatable structure 150 is separated into twelve regions (denoted by Roman numerals I–XII) that correspond to the sectors of fourth rotatable structure 150. The vertical axes in timing diagrams 1400 and 1450 represents the number of pixels illuminated in first and second imaging sensors 14 and 16, respectively. The horizontal axes represents the time, or phase, of the rotation of fourth rotatable structure 150.

Region I in timing diagram 1400 shows the charge integration in first imaging sensor 14 while the image light reflects from a central area of first reflection sector 152 such that every pixel on first imaging sensor 14 is illuminated. Charge is integrated in first imaging sensor 14 while the image light reflects from first reflection sector 152 onto first imaging sensor 14. As fourth rotatable structure 150 rotates, first reflection sector 152 moves out of the objective path of lens 12 while first opaque sector 154 moves into the objective path of lens 12. Fewer pixels of first imaging sensor 14 are illuminated, as shown by region II in timing diagram 1400. In one embodiment, charge integrates in first imaging sensor 14 only while first imaging sensor 14 is fully illuminated (bracket 1). In an alternative embodiment, charge integration in first imaging sensor 14 begins as first reflection sector 152 moves into the objective path of lens 12 and continues as first reflection sector 152 moves out of the objective path of lens 12 and f ewer pixels in first imaging sensor 14 are illuminated (bracket 2).

Once first opaque sector 154 has moved completely into the objective path of lens 12, the image light no longer reflects onto first imaging sensor 14, as shown by region III in timing diagram 1400. Charge is transferred (Xfer 1) from first imaging sensor 14 while first opaque sector 154 prevents the image light from impinging on first imaging sensor 14.

Similarly for second imaging sensor 16, timing diagram 1450 shows the charge integration in second imaging sensor 16 while the image light passes through an increasing portion of first transmission sector 156 (region IV) until the image light passes through a central area of first transmission sector 156 such that every pixel on second imaging sensor 16 is illuminated (region V). Charge is integrated in second imaging sensor 16 while the image light passes through first transmission sector 156 onto second imaging sensor 16. As fourth rotatable structure 150 rotates, first transmission sector 156 moves out of the objective path of lens 12 while second opaque sector 158 moves into the objective path of lens 12. Fewer pixels of second imaging sensor 16 are illuminated, as shown by region VI in timing diagram 1450. In one embodiment, charge integrates in second imaging sensor 16 only while second imaging sensor 16 is fully illuminated (bracket 1). In an alternative embodiment, charge integration in second imaging sensor 16 begins as first transmission sector 156 moves into the objective path of lens 12 and continues as first transmission sector 156 moves out of the objective path of lens 12 and fewer pixels in second imaging sensor 16 are illuminated (bracket 2).

Once second opaque sector 158 has moved completely into the objective path of lens 12, the image light no longer reflects onto second imaging sensor 16, as shown by region VII in timing diagram 1450. Charge is transferred (Xfer 1) from second imaging sensor 16 while second reflection sector 158 prevents the image light from impinging on second imaging sensor 16.

The cycle of charge integration in first imaging sensor 14 is repeated as second reflection sector 160 moves into and out of the objective path of lens 12 and the image light reflects from second reflection sector 160 onto first imaging sensor 14, as shown in regions VIII–X in timing diagram 1400. Charge is again transferred from first imaging sensor 14 once third opaque sector 162 is completely in the objective path of lens 12, thus preventing the image light from impinging on first imaging sensor 14 (region XI). The entire cycle begins anew as first reflection sector 152 moves back into the objective path of lens 12 (region XII).

Since first, second, and third opaque sectors 154, 158, and 162 are formed of absorbing material, the opaque sectors 154, 158, and 162 act as a light shield under which first and second imaging sensors 14 and 16 can transfer charge without smear. The opaque sectors 154, 158, and 162 act as mechanical shutters, thus allowing the imaging sensors 14 and 16 to be full-frame transfer type sensors that lack electronic shutter capabilities. Furthermore, as discussed previously, the wedge shape of the reflection sectors 152 and 160 and first transmission sector 156 necessitates the adjustment of the resulting image either in post-processing or by using weighted pixel values.

Figure 6:
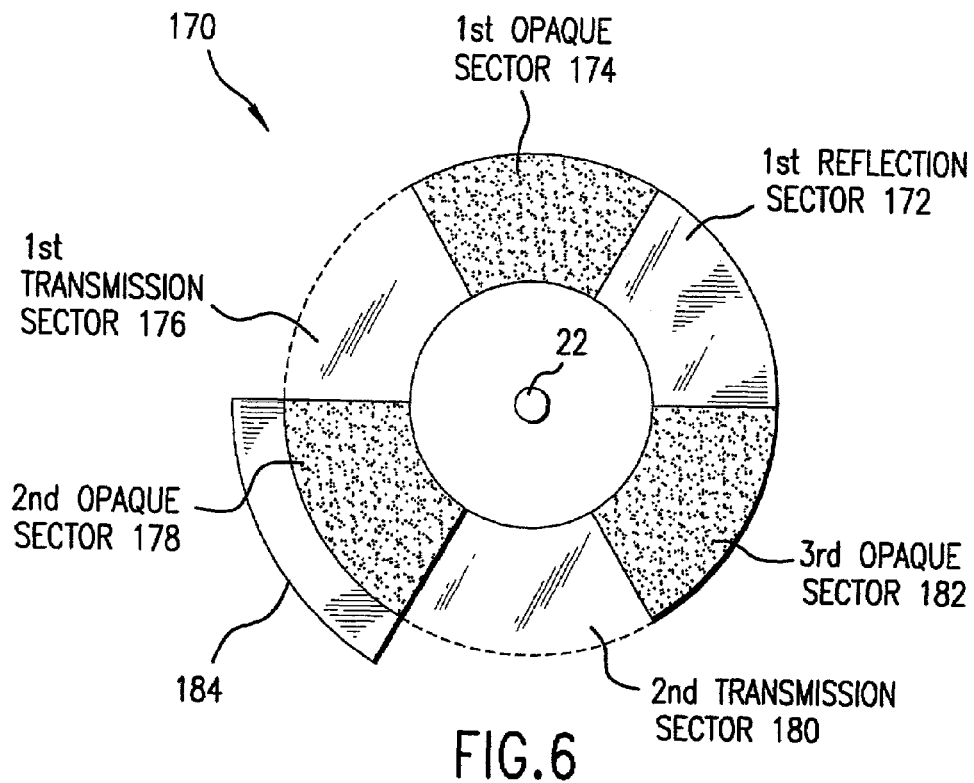
FIG. 6 is a schematic diagram of a fifth embodiment of the rotatable structure.

In FIG. 6, fifth structure 170 is a further variation of second structure 120 that further includes second opaque sector 178 disposed adjacent to first transmission sector 176, second transmission sector 180 disposed adjacent to second opaque sector 178, and third opaque sector 182 disposed adjacent to second transmission sector 180. Fifth structure 170 may also include counterweight 184, which serves to offset the mass distribution differential caused by transmission sectors 176 and 180 when transmission sectors 176 and 180 are air-filled gap, thus preserving dynamic balance in fifth structure 170. As noted previously, the dynamic balancing function of fifth structure 170 may be achieved by other means, for example, relocating the placement of axle attachment point 22 to create a dynamically balanced rotatable structure. In some embodiments, each sector subtends one-sixth of a circle. Other embodiments may vary as described further herein. In operation, the light that propagates along direct axis 26 passes through transmission sectors 176 and 180 and the light that propagates along reflected axis 28 is reflected from first reflection sector 172.

FIGS. 25A and 25B illustrate timing diagrams for the operation of fifth rotatable structure 170. Timing for the operation of first imaging sensor 14 is denoted generally by reference numeral 1500 (FIG. 25A) and timing for the operation of second imaging sensor 16 is denoted generally by reference numeral 1550 (FIG. 25B). The operation of fifth rotatable structure 170 is separated into twelve regions (denoted by Roman numerals I–XII) that correspond to the sectors of fifth rotatable structure 170. The vertical axes in timing diagrams 1500 and 1550 represents the number of pixels illuminated in first and second imaging sensors 14 and 16, respectively. The horizontal axes represents the time, or phase, of the rotation of fifth rotatable structure 170.

Region I in timing diagram 1500 shows the charge integration in first imaging sensor 14 while the image light reflects from a central area of first reflection sector 172 such that every pixel on first imaging sensor 14 is illuminated. Charge is integrated in first imaging sensor 14 while the image light reflects from first reflection sector 172 onto first imaging sensor 14. As fifth rotatable structure 170 rotates, first reflection sector 172 moves out of the objective path of lens 12 while first opaque sector 174 moves into the objective path of lens 12. Fewer pixels of first imaging sensor 14 are illuminated, as shown by region II in timing diagram 1500. In one embodiment, charge integrates in first imaging sensor 14 only while first imaging sensor 14 is fully illuminated (bracket 1). In an alternative embodiment, charge integration in first imaging sensor 14 begins as first reflection sector 172 moves into the objective path of lens 12 and continues as first reflection sector 172 moves out of the objective path of lens 12 and fewer pixels in first imaging sensor 14 are illuminated (bracket 2).

Once first opaque sector 174 has moved completely into the objective path of lens 12, the image light no longer reflects onto first imaging sensor 14, as shown by region III in timing diagram 1500. Charge is transferred (Xfer 1) from first imaging sensor 14 while first opaque sector 174 prevents the image light from impinging on first imaging sensor 14.

Similarly for second imaging sensor 16, timing diagram 1550 shows the charge integration in second imaging sensor 16 while the image light passes through an increasing portion of first transmission sector 176 (region IV) until the image light passes through a central area of first transmission sector 176 such that every pixel on second imaging sensor 16 is illuminated (region V). Charge is integrated in second imaging sensor 16 while the image light passes through first transmission sector 176 onto second imaging sensor 16. As fifth rotatable structure 170 rotates, first transmission sector 176 moves out of the objective path of lens 12 while second opaque sector 178 moves into the objective path of lens 12. Fewer pixels of second imaging sensor 16 are illuminated, as shown by region VI in timing diagram 1550. In one embodiment, charge integrates in second imaging sensor 16 only while second imaging sensor 16 is fully illuminated (bracket 1). In an alternative embodiment, charge integration in second imaging sensor 16 begins as first transmission sector 176 moves into the objective path of lens 12 and continues as first transmission sector 176 moves out of the objective path of lens 12 and fewer pixels in second imaging sensor 16 are illuminated (bracket 2).

Once second opaque sector 178 has moved completely into the objective path of lens 12, the image light no longer reflects onto second imaging sensor 16, as shown by region VII in timing diagram 1550. Charge is transferred (Xfer 1) from second imaging sensor 16 while second reflection sector 158 prevents the image light from impinging on second imaging sensor 16.

The cycle of charge integration in second imaging sensor 16 is repeated as second transmission sector 180 moves into and out of the objective path of lens 12 and the image light reflects from second transmission sector 180 onto second imaging sensor 16, as shown in regions VIII–X in timing diagram 1550. Charge is again transferred from second imaging sensor 16 once third opaque sector 182 is completely in the objective path of lens 12, thus preventing the image light from impinging on second imaging sensor 16 (region XI). The entire cycle begins anew as first reflection sector 172 moves back into the objective path of lens 12, as shown in region XII in timing diagram 1500.

Since first, second, and third opaque sectors 174, 178, and 182 are formed of absorbing material, the opaque sectors 174, 178, and 182 act as a light shield under which first and second imaging sensors 14 and 16 can transfer charge without smear. The opaque sectors 174, 178, and 182 act as mechanical shutters, thus allowing the imaging sensors 14 and 16 to be full-frame transfer type sensors that lack electronic shutter capabilities. Furthermore, as discussed previously, the wedge shape of the reflection sectors 152 and 160 and first transmission sector 176 necessitates the adjustment of the resulting image either in post-processing or by using weighted pixel values.

Color Post-Processing

As mentioned previously, a minimum of three colors (red, blue, and green) are necessary to create a color image. It is not necessary, however, to overlay the imaging sensors with a microfiltered array, to employ color selective coatings, or a combination of both to obtain these three colors directly. Rather, it is possible to obtain only two color images and an all-band image and use a post-processing procedure to obtain the third color.

For example, in an alternative embodiment with reference to first structure 110 (FIG. 2), first imaging sensor 14 includes array 210 of pixel groups 220, where first pixel group 220 includes only first pixel 222 and second pixel 224, which are overlaid with first color microfilter 232 and second color microfilter 234 (FIG. 9). In this case, first imaging sensor 14 only images two colors. To obtain the third color, either: (1) transmission sectors 112 and 116 might be overlaid with a color selective filter or (2) color filter 20 might be placed in the direct path, along direct axis 26 between rotatable structure 100 and second imaging sensor 16.

Figure 19:
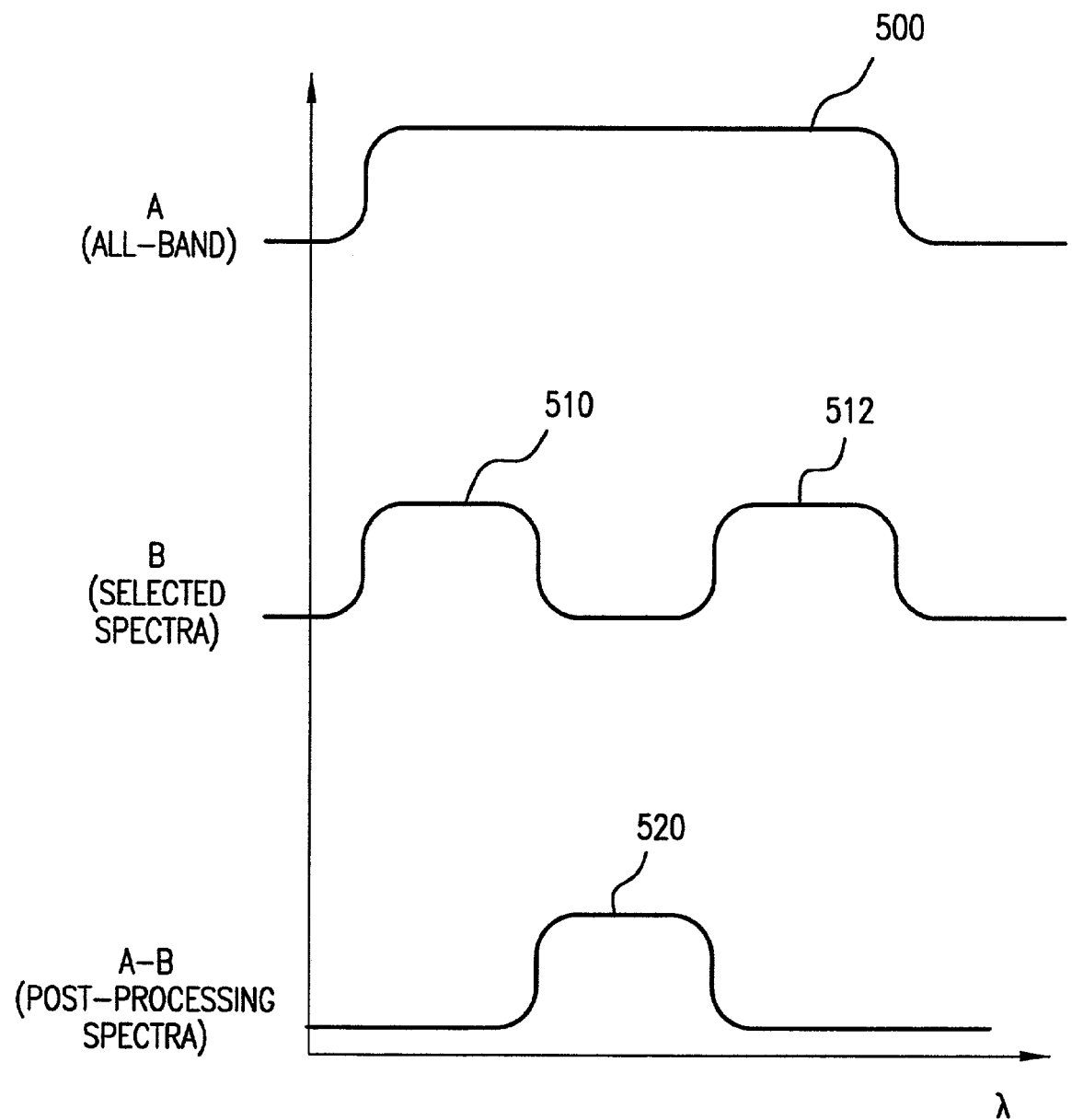
FIG. 19 is an graphic illustration of obtaining a third color from two selected colors using post-processing

However, in this alternative embodiment, the third color is obtained without imposing such mechanical strictures. FIG. 19 illustrates a method for obtaining the third color through post-processing. If no coatings are placed on transmission sectors 112 and/or 116 and color filter 20 is not used, second imaging sensor 16 will receive the all-band (to which the sensor responds) visible light spectrum (A) that passes through transmission sectors 112 and 116, denoted by reference numeral 500. Sensor 16 converts the all-band image light into corresponding all-band electrical image data.

The two microfilters overlying first imaging sensor 14, in this example, pass through to a first imaging sensor 14 the two spectra (B), denoted by reference numerals 510 and 512. Spectra 510 and 512 are converted by first imaging sensor 14 into electrical image data. The selected two-color spectra (B) (510, 512) is subtracted in post-processing electronics from all-band spectrum 500 through post-processing to obtain the third spectra (A-B), denoted by reference numeral 520. In the post-processing electronics, the all-band image 500 is represented by an array of pixel values that are output from sensor 16. In the post-processing electronics, a first selected spectra 510 is represented by another array of pixel values that are interpolated from corresponding pixels output from sensor 14, and a second selected spectra 512 is represented by a third array of pixel values that are interpolated from corresponding pixels output from sensor 14. The second array (corresponding to spectrum 510) and the third array (corresponding to spectrum 512) are subtracted from the first array (corresponding to the all-band spectrum 500), on a pixel by pixel basis, to provide the array corresponding to the third spectral component 520. This method can be employed in any of the situations described herein where all-band spectrum 500 is received by one imaging sensor and selected spectra 510 and 512 are received by the other imaging sensor.

Choppered-Wheel

In another embodiment, camera 10 is a 2-chip cinematography camera that employs two sensors, for example, a color and monochrome sensor positioned at the respective focal planes of an optical system (FIG. 1). That might be accomplished by positioning a sensor, e.g., second imaging sensor 16, in the film plane, along direct axis 26, and another sensor, e.g., first imaging sensor 14, at the plane of the viewfinder, along reflected axis 28, of a traditional 35 mm film based motion picture camera.

In a traditional film based cinematography camera there is only one image capture area—the film plane. In this case, a rotating mirror is used to shutter the film during film transport between frames, and at the same time, to divert the image to a ground glass viewfinder. When the rotating mirror is located at the exit pupil of lens 12, the image is reflected onto the ground glass viewfinder while the film in the film gate is being moved to a new position. Then, when the rotating mirror moves away from the exit pupil of lens 12, the image is projected through the mirror onto the film which had been first positioned in the film gate and then second brought to a stop to be not moving during exposure to light.

In the present embodiment, the sensors will convert the variations in light intensity to electrical signals in each of many pixels. In a CCD type sensor, the signal charge captured by the pixels is transferred through other light sensitive pixels before they reach a storage area or a readout device on the sensor. Thus, it is important that this transfer take place in darkness. If these light sensitive pixels are illuminated during the transfer, the signal will be contaminated by additional "smear" signal charge. To avoid image smear, the sensors must not be illuminated during transfer of the image from the sensor image area to the storage or readout area.

In a 2-chip camera employing two image sensors, the traditional method as used in 35 mm film based cameras could be used to prevent smear. For example, the electronic image is read out from one sensor (e.g., sensor 14, FIG. 1) while it is in darkness and the image light passes to the other sensor and an image is being collected in the other sensor (e.g., sensor 16). However, the two sensors would not be exposed simultaneously, and a lack of simultaneous exposure could lead to undesirable artifacts in the video images as viewed later.

Alternatively, a beam splitter could be used to split the light between the two sensors and allow them to be exposed simultaneously. However, there would be no shutter action. Image smear would not be prevented unless a technology, such as used in interline transfer sensors, were to be used. Such ILT sensors reduce the fill factor and reduce sensor sensitivity. The use of both a rotating mirror and a beam splitter is precluded for geometrical reasons when the use of existing industry standard optical components (e.g., film gate and lenses for industry standard cinematography cameras) is desired. In a 2-chip camera, it is desirable to employ a methodology that prevents image smear and allows simultaneous image capture by two sensors through the same objective lens.

Figure 7:
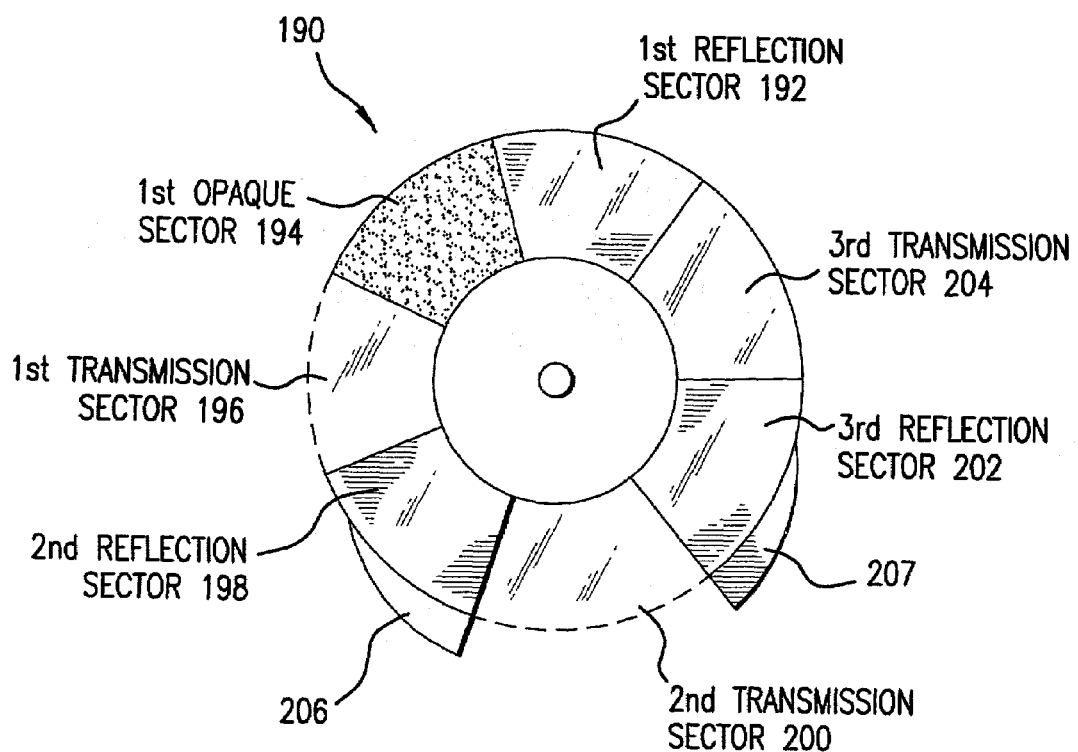
FIG. 7 is a schematic diagram of a choppered-wheel embodiment of the rotatable structure.

FIG. 7 illustrates a choppered-wheel rotatable structure that allows a time average simultaneous exposure of the two image sensors using a novel segmented rotating mirror. Choppered-wheel 190 is a variation of second structure 120 that further includes second reflection sector 198 as in structure 130 (FIG. 4) disposed adjacent to first transmission sector 196 and second transmission sector 200 disposed adjacent to second reflection sector 198. Additionally, choppered-wheel 190 may further include third reflection sector 202 disposed adjacent to second transmission sector 200 and third transmission sector 204 disposed adjacent to third reflection sector 202 as in structure 190 (FIG. 7). In other embodiments, additional alternating reflection and transmission sectors might be used. Choppered-wheel 190 is designed such that the sum of the angular extents of the sectors for all the reflection sectors (e.g., 192, 198, and 202) is made equal to the angular extent of the sectors for all the transmission sectors (e.g., 196, 200, and 204) when the total exposure for both imaging sensors 14 and 16 is to be equal.

In a variant embodiment, when one sensor has an overlying color filter array (FIG. 8) or an intervening external color filter (e.g., color filters 18 or 20) which reduces the total amount of light reaching the sensor, an improvement in the total system dynamic range may be achieved by increasing the relative exposure for the sensor that has filter losses relative to the sensor that does not. The ratio of their exposures is determined such as to optimize the system dynamic range. In this case, choppered-wheel 190 is designed such that the ratio of the sum of the angular extents of the sectors for all the reflection sectors (e.g., 192, 198, and 202) to the sum of the angular extents of the sectors for all the transmission sectors (e.g., 196, 200, and 204) will be equal to the ratio of the desired exposures of the two sensors.

Choppered-wheel 190 may also include counterweights 206 and 207, which serve to offset the mass distribution differential caused by the transmission sectors 196, 200, and 204 when the transmission sectors are air-filled gaps, thus preserving dynamic balance in choppered-wheel 190. Where further transmission sectors are included, the counterweight location is adjusted as necessary to preserve dynamic balance in choppered-wheel 190. As noted previously, the dynamic balancing function of choppered-wheel 190 may be achieved by other means, for example, relocating the placement of axle attachment point 22 to create a dynamically balanced rotatable structure.

In operation, the light entering lens 12 will be directed by the reflection sectors (e.g., 192, 198, and 202) to first imaging sensor 14 to the exclusion of second imaging sensor 16. Likewise, the light allowed to pass through the transmission sectors (e.g., 196, 200, and 204) to second imaging sensor 16 will not be detected by first imaging sensor 14. First opaque sector 194 acts as a shutter that prevents light from reaching either imaging sensors. The physical geometry (i.e., FIG. 1) enabling this operation is preferably made to be the same as used in a traditional 35 mm film based cinematography camera.

Imaging sensors 14 and 16 are operated with timing control such that when first opaque sector 194 is positioned at the exit pupil of lens 12, the charge transfer operation of both imaging sensors 14 and 16 is performed. The angular extent of this region of the structure 190 is designed such that the imaging sensors remain in darkness for a time at least as long as required to affect the transfer of an image to storage areas of sensors 14 and 16 or transfer out through a readout register. The wheel rotates uniformly at the frame rate. First opaque sector 194 must be large enough to provide blanking over the range of frame rates anticipated for camera 10.

Imaging sensors 14 and 16 are further operated with timing control such that the two sensors are integrating signal charge once per rotation of choppered-wheel structure 190 and will receive light from the scene that is divided into a number of discrete intervals by the segments of choppered-wheel 190. The net result of the rotation of the choppered-wheel structure 190 is to ensure that during integration, the imaging sensors achieve a time averaged near simultaneous capture of the image. For example, the image will be projected alternately onto first imaging sensor 14 and then onto second imaging sensor 16 as many times as the reflection and transmission sectors provide (e.g. three times in FIG. 7). Note that the center of exposure of all transmission sectors in FIG. 7 is the center of second transmission sector 200. The center of the exposure of all refection sectors in FIG. 7 is the center of third reflection sector 202. Thus, the center of the exposure of sensors 14 and 16 are separated by the time it takes to rotate through the angular extent of about one sector. A structure 190 having additional choppered sectors will have exposure time centers even closer.

A variant design (not shown) omits first opaque sector 194. Instead, each imaging sensor is read out in darkness during the last segment of the revolution of choppered-wheel 190 in which the other imaging sensor is illuminated. In this variant, the image information from the first imaging sensor 14 to be read out is then buffered in an internal light shielded memory or in an external memory. The memory buffered image is then read out concurrently with the non-memory buffered image from second imaging sensor 16 so that the same pixel in each image is fed to further processing concurrently.

In alternative embodiments, the light reflected to first imaging sensor 14 is imaged as a monochrome image or a microfiltered pixel array color image (FIGS. 8 and 9). In array 210 pattern, four pixels (222, 224, 226, and 228) in a rectangular group 220 are imaged together. For example, one pixel is covered with a red microfilter; another pixel is covered with a blue microfilter; and the last two pixels are covered with green microfilters. Alternative filter color selections might be chosen.

In a modified array 210 pattern in one of imaging sensor 14 or 16, two pixels in pixel group 220 are covered with microfilters. For example, one pixel is covered with a red microfilter, and the other pixel is covered with a blue microfilter. The other of imaging sensor 14 or 16 images either the third color (e.g., green) or all-band spectra from which the third color can be derived. The outputs from imaging sensors 14 and 16 either provide three colors or are processed to regenerate a three color image. For example, brightness is sensed by second imaging sensor 16 two colors are sensed by the two-color microfilters of first imaging sensor 14. The third color is developed from processing brightness using second imaging sensor 16 and the two colors from first imaging sensor 14. Variants may be made using different ways to reconstruct the primary colors.

A special coating (e.g., FIG. 10) may be applied to the reflection sectors of choppered-wheel 190 to filter out undesired wavelengths. For example, the removal of near IR wavelengths to improve color fidelity when first imaging sensor 14 employs color filters which may have transmission in the near IR, as is a good case for monolithic filters.

FIGS. 26A and 26B illustrate timing diagrams for the operation of choppered-wheel 190. Timing for the operation of first imaging sensor 14 is denoted generally by reference numeral 1600 (FIG. 26A) and timing for the operation of second imaging sensor 16 is denoted generally by reference numeral 1650 (FIG. 26B). The operation of choppered-wheel 190 is separated into fourteen regions (denoted by Roman numerals I–XIV) that correspond to the sectors of choppered-wheel 190. The vertical axes in timing diagrams 1600 and 1650 represents the number of pixels illuminated in first and second imaging sensors 14 and 16, respectively. The horizontal axes represents the time, or phase, of the rotation of choppered-wheel 190.

Region I in timing diagram 1600 shows the charge integration in first imaging sensor 14 while the image light reflects from a central area of first reflection sector 192 such that every pixel on first imaging sensor 14 is illuminated. Charge is integrated in first imaging sensor 14 while the image light reflects from first reflection sector 192 onto first imaging sensor 14. As choppered-wheel 190 rotates, first reflection sector 192 moves out of the objective path of lens 12 while third transmission sector 204 moves into the objective path of lens 12. Fewer pixels of first imaging sensor 14 are illuminated, as shown by region II in timing diagram 1600. In the present embodiment, the imaging sensors 14 and 16 are operated to accumulate photo charge over a time period that extends over multiple reflection and transmission sectors (bracket 3). First imaging sensor 14 is operated to accumulate photo charge over regions I–X and XIV of timing diagram 1600. Second imaging sensor 16 is operated to accumulate photo charge over regions II–XI of timing diagram 1650. However, due to the design of choppered-wheel 190, first imaging sensor 14 actually converts light to electrical signal (accumulated in the sensor) over only regions I–II, IV–VI, VIII–X and XIV of timing diagram 1600. During regions III and VII, first imaging sensor 14 is in darkness inside of the camera body. During regions I, V and IX, first imaging sensor 14 is fully illuminated, and during regions II, IV, VI, VIII, X and XIV, first imaging sensor 14 is partially illuminated. The center of region V is the center of the exposure interval of first imaging sensor 14.

Similarly for second imaging sensor 16, timing diagram 1650 shows the charge integration in second imaging sensor 16 while the image light passes through an increasing portion of third transmission sector 204 (region II) until the image light passes through a central area of third transmission sector 204 such that every pixel on second imaging sensor 16 is illuminated (region III). Charge is integrated in second imaging sensor 16 while the image light passes through third transmission sector 204 onto second imaging sensor 16. As choppered-wheel 190 rotates, third transmission sector 204 moves out of the objective path of lens 12 while third reflection sector 202 moves into the objective path of lens 12. Fewer pixels of second imaging sensor 16 are illuminated, as shown by region IV in timing diagram 1650. Due to the design of choppered-wheel 190, second imaging sensor 16 actually converts light to electrical signal (accumulated in the sensor) over only regions II–IV, VI–VIII and X–XII of timing diagram 1650. During regions V and IX, second imaging sensor 16 is in darkness inside of the camera body. During regions III, VII and XI, second imaging sensor 16 is fully illuminated, and during regions II, IV, VI, VIII, X and XII, second imaging sensor 16 is partially illuminated. The center of region VII is the center of the exposure interval of second imaging sensor 16.

Thus, the difference in the center of the exposure intervals of first and second imaging sensors 14 and 16 is the time between the center of region V (timing diagram 1600) and the center of region VII (timing diagram 1650). Choppered-wheel 190 may be designed to include many more chopped sectors to narrow the time difference between the centers of the exposures of first and second imaging sensor 14 and 16 to minimized any artifacts that may be caused by differences in exposure times.

Once first opaque sector 194 has moved completely into the objective path of lens 12, the image light no longer reflects onto first and second imaging sensor 14 and 16, as shown by region XIII in timing diagrams 1600 and 1650. Charge is transferred (Xfer 1) from both first and second imaging sensors 14 and 16 while first opaque sector 194 prevents the image light from impinging on the imaging sensors 14 and 16. The entire cycle begins anew as first reflection sector 192 moves back into the objective path of lens 12, as shown in region XIV in timing diagram 1600.

Since first opaque sector 194 is formed of absorbing material, first opaque sector 194 acts as a light shield under which the imaging sensors 14 and 16 can transfer charge without smear. First opaque sector 194 acts as a mechanical shutter, thus allowing the imaging sensors 14 and 16 to be full-frame transfer type sensors that lack electronic shutter capabilities. Furthermore, as discussed previously, the wedge shape of first reflection sector 192 and first transmission sector 196 necessitates the adjustment of the resulting image either in post-processing or by using weighted pixel values.

Improved Blue/Green Response

In general, the physics of many solid state sensors (CCD or CMOS) of the preferred type causes the sensor to be more sensitive to red light than to blue light. Short wavelengths, such as blue and ultraviolet, are attenuated quickly in upper layers of poly-crystalline silicon that are frequently used in photogates of a frame transfer sensor. Similarly, the human eye is more sensitive to green light, which lies in the middle of the visible light spectrum, than to any other wavelength, or color, of visible light. Therefore, in many applications, it is desirable to make a camera that is more sensitive to at least one of blue and green light in order to satisfy these two considerations and/or that adjusts color sensitivities to match the color response of the intended display (e.g. computer monitor, television, projector).

Figure 13:
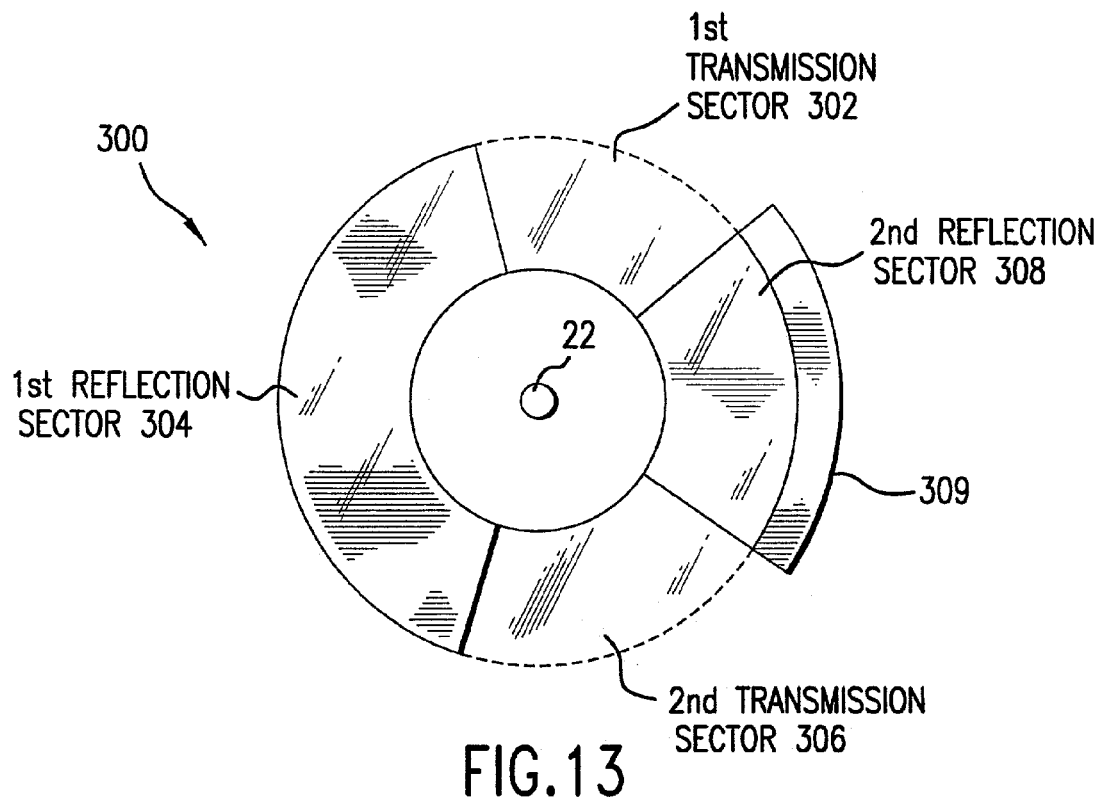
FIG. 13 is a schematic diagram of a sixth embodiment of the rotatable structure having a larger reflection sector.

In FIG. 13, sixth structure 300 is a variation of first structure 110 in which first reflection sector 304 and second reflection sector 308 are each characterized by a corresponding angular extent and the angular extent of first reflection sector 304 is unequal to the angular extent of second reflection sector 308. To compensate for the unequal size of the segments, sixth structure 300 may include counterweight 309 to preserve the dynamic balance of sixth structure 300, as described previously. In this embodiment, first reflection sector 304 includes a coating to reflect a first color and second reflection sector 308 includes a coating to reflect a second color (FIGS. 10 and 11). The angular extent of first reflection sector 304 is greater than the angular extent of second reflection sector 308 by an amount sufficient to compensate for differences in a response sensitivity of first imaging sensor 14 to the first color as compared to the second color, an ocular sensitivity of a human observer to the first color as compared to the second color, or possibly both.

Therefore, if the desire is to improve the blue response of first imaging sensor 14, the larger first reflection sector 304 would be coated to reflect the color blue while second reflection sector 308 is coated to reflect either red or green, thus increasing the time over which first imaging sensor 14 accumulates charge for the color blue with respect to the colors red or green. Similarly, if the desire is to improve the human observational sensitivity of the image produced by first imaging sensor 14, the larger first reflection sector 304 would be coated to reflect the color green while second reflection sector 308 is coated to reflect either red or blue, thus increasing the time over which first imaging sensor 14 accumulates charge for the color green with respect to the colors red or blue.

Figure 14:
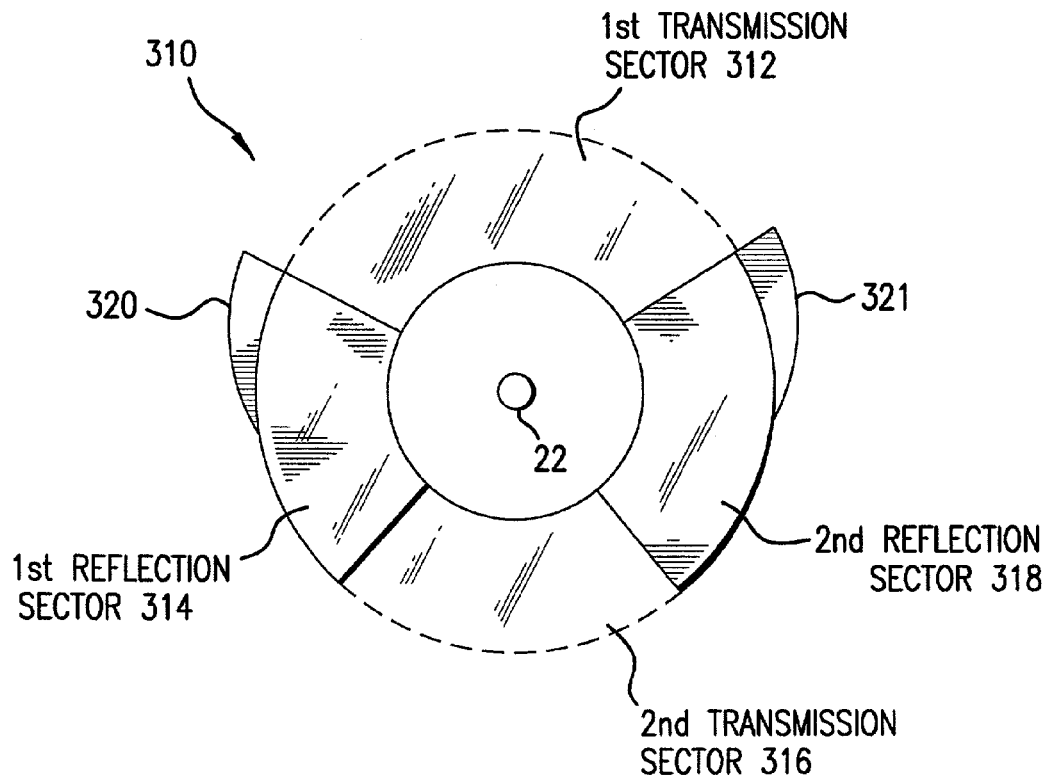
FIG. 14 is a schematic diagram of a seventh embodiment of the rotatable structure having a larger transmission sector.

In FIG. 14, seventh structure 310 is a variation of first structure 110 in which first transmission sector 312 and second transmission sector 316 are each characterized by a corresponding angular extent and the angular extent of first transmission sector 312 is unequal to the angular extent of second transmission sector 316. To compensate for the unequal size of the segments, seventh structure 310 may include counterweights 320 and 321 to preserve the dynamic balance of seventh structure 310, as described previously. In this embodiment, first transmission sector 312 includes a coating to pass a first color and second transmission sector 316 includes a coating to pass a second color (FIG. 12). The angular extent of first transmission sector 312 is greater than the angular extent of second transmission sector 316 by an amount sufficient to compensate for differences in a response sensitivity of second imaging sensor 16 to the first color as compared to the second color, an ocular sensitivity of a human observer to the first color as compared to the second color, or possibly both.

Therefore, if the desire is to improve the blue response of second imaging sensor 16, the larger first transmission sector 312 would be coated to pass the color blue while second transmission sector 316 is coated to pass either red or green, thus increasing the time over which second imaging sensor 16 accumulates charge for the color blue with respect to the colors red or green. Similarly, if the desire is to improve the human observational sensitivity of the image produced by second imaging sensor 16, the larger first transmission sector 312 would be coated to pass the color green while second transmission sector 316 is coated to pass either red or blue, thus increasing the time over which first imaging sensor 14 accumulates charge for the color green with respect to the colors red or blue.

FIGS. 13 and 14 also illustrate the situation where first reflection sector 304 or 314 and first transmission sector 302 or 316 are each characterized by a corresponding angular extent and the angular extent of first reflection sector 304 or 314 is unequal to the angular extent of first transmission sector 302 or 316. Where the desire is to improve the response of first imaging sensor 14 (FIG. 13), the larger first reflection sector 304 includes a coating to reflect a first color and first transmission sector 302 includes a coating to pass a second color. The angular extent of first reflection sector 304 is greater than the angular extent of first transmission sector 302 by an amount sufficient to compensate for differences in a first response sensitivity of first imaging sensor 14 to the first color as compared to a second response sensitivity of second imaging sensor 16 to the second color, an ocular sensitivity of a human observer to the first color as compared to the second color, or possibly both.

Therefore, if the desire is to improve the blue response of first imaging sensor 14, the larger first reflection sector 304 would be coated to reflect the color blue while first transmission sector 302 is coated to pass either red or green, thus increasing the time over which first imaging sensor 14 accumulates charge for the color blue with respect to the time over which second imaging sensor 16 accumulates charge for the colors red or green. Similarly, if the desire is to improve the human observational sensitivity of the image produced by first imaging sensor 14, the larger first reflection sector 304 would be coated to reflect the color green while first transmission sector 302 is coated to pass either red or blue, thus increasing the time over which first imaging sensor 14 accumulates charge for the color green with respect to the time over which second imaging sensor 16 accumulates charge for the colors red or blue.

Similarly, where the desire is to improve the response of second imaging sensor 16 (FIG. 14), the larger first transmission sector 302 includes a coating to pass a first color and first reflection sector 304 includes a coating to reflect a second color. The angular extent of first transmission sector 302 is greater than the angular extent of first reflection sector 304 by an amount sufficient to compensate for differences in a first response sensitivity of second imaging sensor 16 to the first color as compared to a second response sensitivity of first imaging sensor 14 to the second color, an ocular sensitivity of a human observer to the first color as compared to the second color, or possibly both.

Therefore, if the desire is to improve the blue response of second imaging sensor 16, the larger first transmission sector 302 would be coated to pass the color blue while first reflection sector 304 is coated to reflect either red or green, thus increasing the time over which second imaging sensor 16 accumulates charge for the color blue with respect to the time over which first imaging sensor 14 accumulates charge for the colors red or green. Similarly, if the desire is to improve the human observational sensitivity of the image produced by second imaging sensor 16, the larger first transmission sector 302 would be coated to pass the color green while first reflection sector 304 is coated to reflect either red or blue, thus increasing the time over which second imaging sensor 16 accumulates charge for the color green with respect to the time over which first imaging sensor 14 accumulates charge for the colors red or blue.

Figure 15:
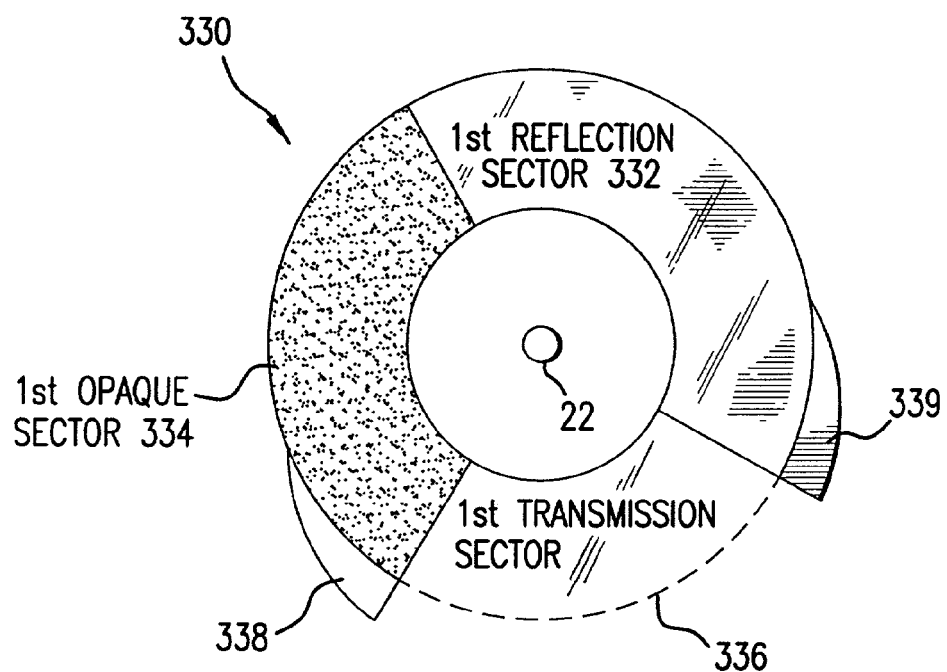
FIG. 15 is a schematic diagram of an eighth embodiment of the rotatable structure having a larger reflection sector.

In FIG. 15, eighth structure 330 is a variation of second structure 120 in which first reflection sector 332 and first transmission sector 336 are each characterized by a corresponding angular extent and the angular extent of first reflection sector 332 is unequal to the angular extent of first transmission sector 336. To compensate for weight loss when first transmission sector 336 is an air-filled gap, eighth structure 330 may include counterweights 338 and 339 to preserve the dynamic balance of eighth structure 330, as described previously.

In this embodiment, second imaging sensor 16 includes an array 210 of pixel groups 220 (FIG. 8). First pixel group 220 includes a plurality of pixels, e.g., pixels 222, 224, 226, 228, which are arranged to image a variety of colors by overlaying the pixels with color-specific microfilters, as described previously. The plural pixels of first pixel group 220 includes a first pixel 222 and the first pixel 222 is overlaid with first color microfilter 232 (FIG. 9), thus allowing second imaging sensor 16 to image a particular color. First reflection sector 332 includes a coating to reflect a first color and first color microfilter 232 selects a second color. Alternatively, first color filter 18 is disposed along reflected axis 28 between rotatable structure 100 and first imaging sensor 14 (FIG. 1) to image the first color, obviating the need for the reflection coating. The angular extent of first reflection sector 332 is greater than the angular extent of first transmission sector 336 by an amount sufficient to compensate for differences in a first response sensitivity of first imaging sensor 14 to the first color as compared to a second response sensitivity of second imaging sensor 16 to the second color, an ocular sensitivity of a human observer to the first color as compared to the second color, or possibly both.

Therefore, if the desire is to improve the blue response of first imaging sensor 14, the larger first reflection sector 332 would be coated to reflect the color blue while microfiltered pixel array 210 overlaying second imaging sensor 16 selects either red or green, thus increasing the time over which first imaging sensor 14 accumulates charge for the color blue with respect to the time over which second imaging sensor 16 accumulates charge for the colors red or green. Similarly, if the desire is to improve the sensitivity to be comparable to human observational sensitivity of the image produced by first imaging sensor 14, the larger first reflection sector 332 would be coated to reflect the color green while microfiltered pixel array 210 overlaying second imaging sensor 16 selects either red or blue, thus increasing the time over which first imaging sensor 14 accumulates charge for the color green with respect to the time over which second imaging sensor 16 accumulates charge for the colors red or blue. In other embodiments, microfiltered pixel array 210 overlaying second imaging sensor 16 may select two colors, e.g., red and green or red and blue.

Figure 16:
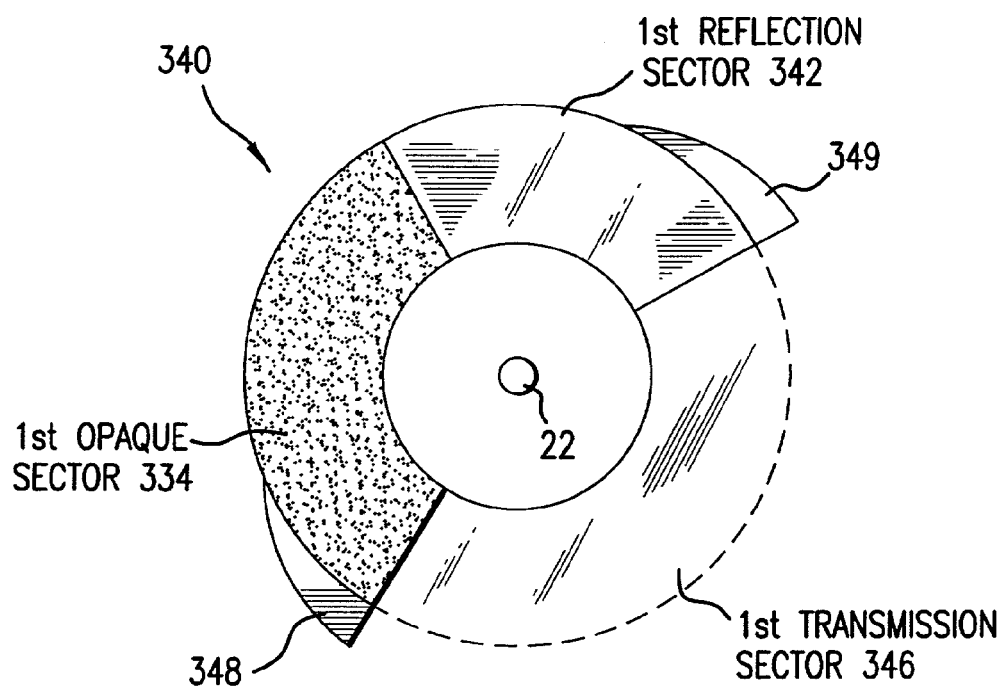
FIG. 16 is a schematic diagram of a ninth embodiment of the rotatable structure having a larger transmission sector.

In FIG. 16, ninth structure 340 is a variation of second structure 120 in which first reflection sector 342 and first transmission sector 346 are each characterized by a corresponding angular extent and the angular extent of the angular extent of first reflection sector 342 is unequal to the angular extent of first transmission sector 346. To compensate for weight loss when first transmission sector 340 is an air-filled gap, ninth structure 340 may include counterweights 348 and 349 to preserve the dynamic balance of ninth structure 340, as described previously.

In this embodiment, first imaging sensor 14 includes an array 210 of pixel groups 220 (FIG. 8). First pixel group 220 includes a plurality of pixels, e.g., pixels 222, 224, 226, 228, which are arranged to image a variety of colors by overlaying the pixels with color-specific microfilters, as described previously. The plural pixels of first pixel group 220 includes a first pixel 222 and the first pixel 222 is overlaid with first color microfilter 232 (FIG. 9), thus allowing first imaging sensor 14 to image a particular color. First transmission sector 346 includes a coating to pass a first color and first color microfilter 232 selects a second color. Alternatively, second color filter 20 is disposed along direct axis 26 between rotatable structure 100 and second imaging sensor 16 (FIG. 1) to image the first color, obviating the need for the transmission coating. The angular extent of first transmission sector 346 is greater than the angular extent of first reflection sector 342 by an amount sufficient to compensate for differences in a first response sensitivity of second imaging sensor 16 to the first color as compared to a second response sensitivity of first imaging sensor 14 to the second color, an ocular sensitivity of a human observer to the first color as compared to the second color, or possibly both.

Therefore, if the desire is to improve the blue response of second imaging sensor 16, the larger first transmission sector 346 would be coated to pass the color blue while microfiltered pixel array 210 overlaying first imaging sensor 14 selects either red or green, thus increasing the time over which second imaging sensor 16 accumulates charge for the color blue with respect to the time over which first imaging sensor 14 accumulates charge for the colors red or green. Similarly, if the desire is to improve the human observational sensitivity of the image produced by second imaging sensor 16, the larger first transmission sector 346 would be coated to pass the color green while microfiltered pixel array 210 overlaying first imaging sensor 14 selects either red or blue, thus increasing the time over which second imaging sensor 16 accumulates charge for the color green with respect to the time over which first imaging sensor 14 accumulates charge for the colors red or blue. In other embodiments, microfiltered pixel array 210 overlaying first imaging sensor 14 may select two colors, e.g., red and green or red and blue.

3-Chip Camera

Figure 17:
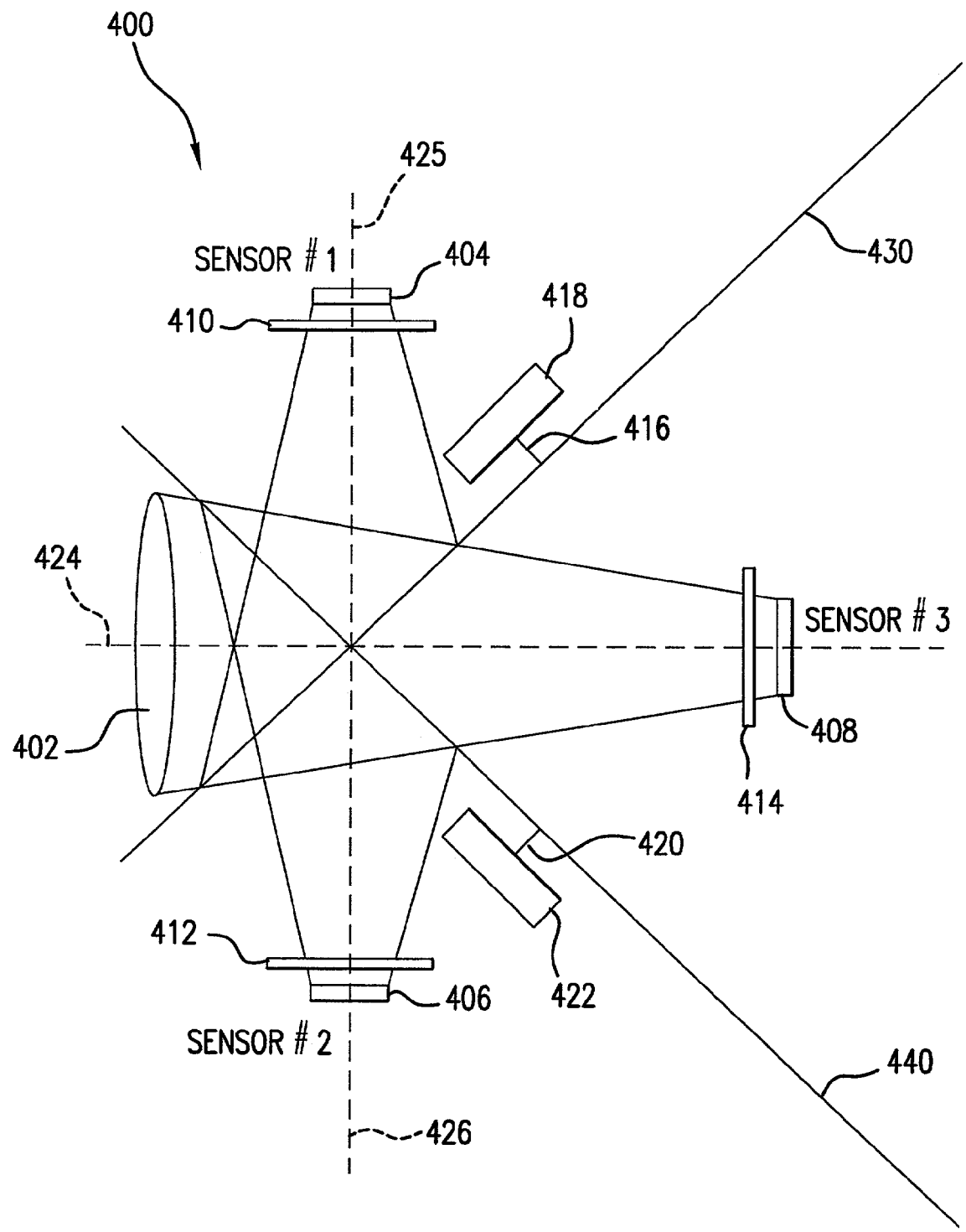
FIG. 17 is a schematic diagram of a preferred embodiment of a 3-chip camera according to the present invention.

In FIG. 17, 3-chip camera 400 includes lens 402, first imaging sensor 404, second imaging sensor 406, third imaging sensor 408, first rotatable structure 430, and second rotatable structure 440. First imaging sensor 402 is disposed to image light that propagates along first reflected axis 425, second imaging sensor 406 is disposed to image light that propagates along second reflected axis 426, and third imaging sensor 408 is disposed to image light that propagates along direct axis 424. First rotatable structure 430 is disposed to define a first rotation plane that is oblique to first reflected axis 425 and direct axis 424. Second rotatable structure 440 is disposed to define a second rotation plane that is oblique to second reflected axis 426 and direct axis 424.

In operation, first motor 418 rotates first axle 416 that in turn rotates first rotatable structure 430, and second motor 422 rotates second axle 420 that in turn rotates second rotatable structure 440. Lens 402 focuses an image conjugate onto third imaging sensor 408 along direct axis 424 such that third imaging sensor 408 converts the image light into electrical signals. Lens 402 also focuses the image conjugate onto first imaging sensor 404 along first reflected axis 425. The image light through lens 402 along direct axis 424 is reflected from a reflection sector of first rotatable structure 430 to propagate along first reflected axis 425. First imaging sensor 404 converts the image light into electrical signals. Lens 402 further focuses the image conjugate onto second imaging sensor 406 along second reflected axis 426. The image light through lens 402 along direct axis 424 is reflected from a reflection sector of second rotatable structure 440 to propagate along second reflected axis 426. Second imaging sensor 406 converts the image light into electrical signals. First and second rotatable structures 430 and 440 are formed having an inner radius such that the image light focused by lens 402 does not impinge on either first motor 418 or second motor 422 but only on the surface of rotatable structures 430 and 440. Other formations of first and second rotatable structures 430 and 440 are also possible that satisfy the need to avoid first and second motors 418 and 422.

In some variants of the invention, camera 400 also includes first color filter 410 disposed along first reflected axis 425 between first rotatable structure 430 and first imaging sensor 404. In other variants of the invention, camera 400 further includes second color filter 412 disposed along second reflected axis 426 between second rotatable structure 440 and second imaging sensor 406. In further variants of the inventions, camera 400 additionally includes third color filter 414 disposed along direct axis 424 between first and second rotatable structures 430 and 440 and third imaging sensor 408.

Figure 18A:
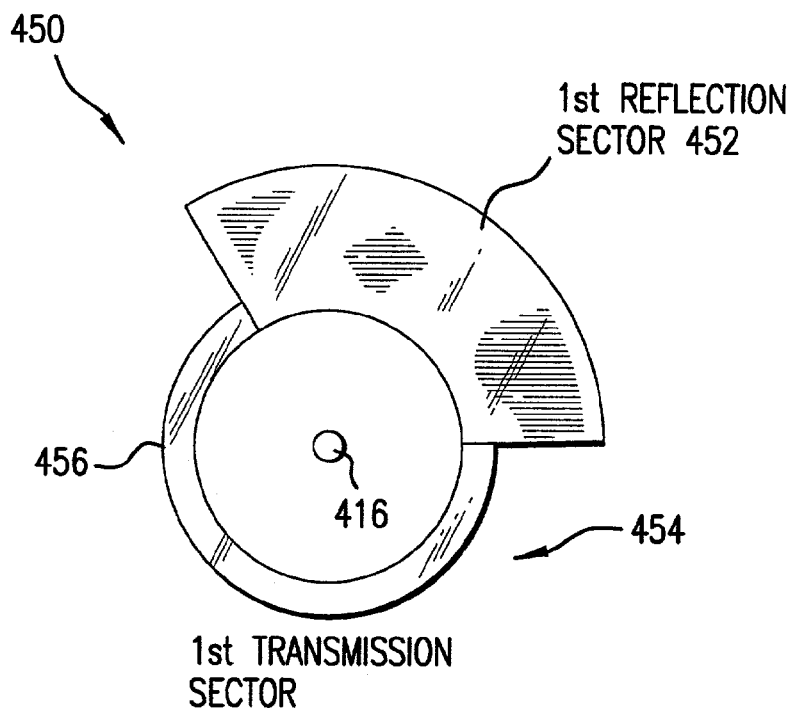
FIG. 18A is a schematic diagram of a rotatable structure to be used in the 3-chip camera of the present invention.

First and second rotatable structures 430 and 440 are represented as rotatable structure 450 (FIG. 18A) that includes first reflection sector 452 and "air-filled" first transmission sector 454 disposed adjacent to first reflection sector 452. First transmission sector 454 is a gap (i.e., air-filled), as indicated by reference numeral 454. By making first transmission sector 454 a gap, first and second rotatable structures 430 and 440 can be positioned and phased such that the reflection sectors of rotatable structures 430 and 440 do not collide as rotatable structures 430 and 440 are being rotated. Rotatable structure 450 also includes counterweight 456, which serves to offset the mass distribution differential caused by first transmission sector 454 being an air-filled gap, thus preserving dynamic balance in rotatable structure 450. The dynamic balancing function of rotatable structure 450 may be achieved by other means, for example, relocating the placement of axle attachment point 416 or 420 to create a dynamically balanced rotatable structure.

Preferably, first reflection sector 452 of rotatable structures 430 and 440 covers one-third of a circle and is coated such that rotatable structures 430 and 440 each reflect a respective color (e.g., one rotatable structure reflects blue and the other reflects red). Alternatively, color filters 410, 412, and 414 may be used to select the appropriate color to impinge on imaging sensors 404, 406, and 408. A motor control unit controls the motor speed and phase so that rotatable structures 430 and 440 do not collide, and in fact, so that there exists a time when neither rotatable structure is positioned at the exit pupil of lens 402 so as to interrupt the direct light path through lens 402 and onto third imaging sensor 408.

Figure 18B:
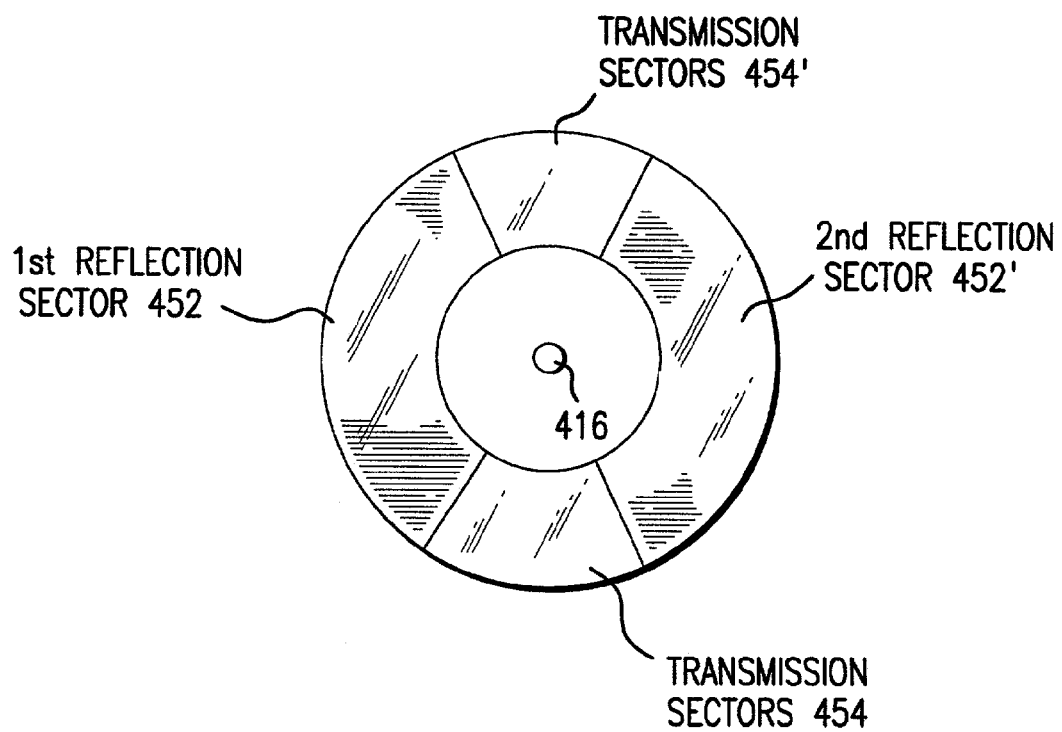
FIG. 18B is a front view of the rotatable structures of the 3-chip camera in operation.

FIG. 18B shows a front view (as seen from lens 402) of the preferred overlap positioning of superimposed rotatable structures 430 and 440 during operation of the 3-chip camera 400. A motor control unit controls the motor speed and phase of motors 418 and 422 so that during a first third of a revolution, imaging light of a first color is reflected from first reflection sector 452 onto first imaging sensor 404. During the next one-sixth of the revolution, first and second transmission sector 454 overlap and allow imaging light of a second color to be reflected onto third imaging sensor 408. During the next one-third of the revolution, imaging light of a third color is reflected from second reflection sector 452' onto second imaging sensor 406. During the last one-sixth of the revolution, imaging light of the second color passes again through first and second transmission sector 454 onto third imaging sensor 408. An advantage of 3-chip camera 400 is that the imaging light passes through nothing but air, or third color filter 414, while passing from lens 402 to third imaging sensor 408. High quality color images are obtained. When the imaging light must pass through some substrate material, e.g., a glass transmission sector some attenuation and/or distortion might be present. Although the scenario described above presumes that the overlapping transmission sector regions are each one-sixth of a circle, other variations are possible and will not effect the operation of the 3-chip camera 400.

Figure 18D:
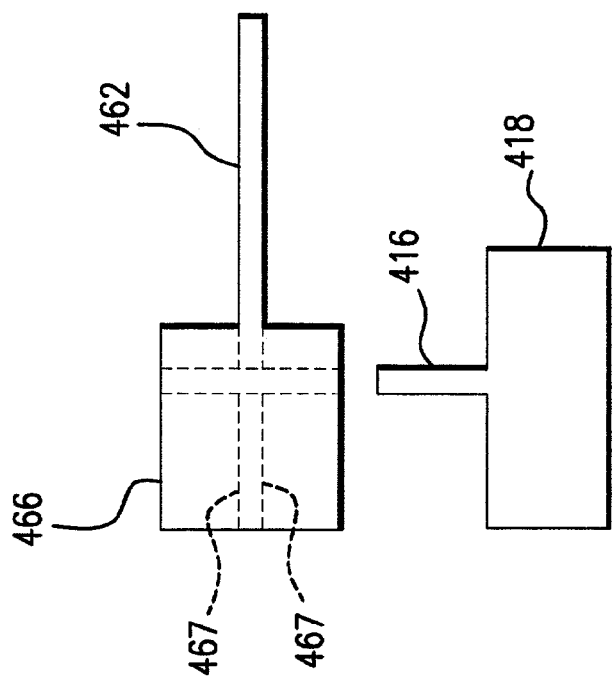
FIGS. 18C and 18D are plan and sectional views of an alternative embodiment of the rotatable structure of the present invention.
Figure 18C:
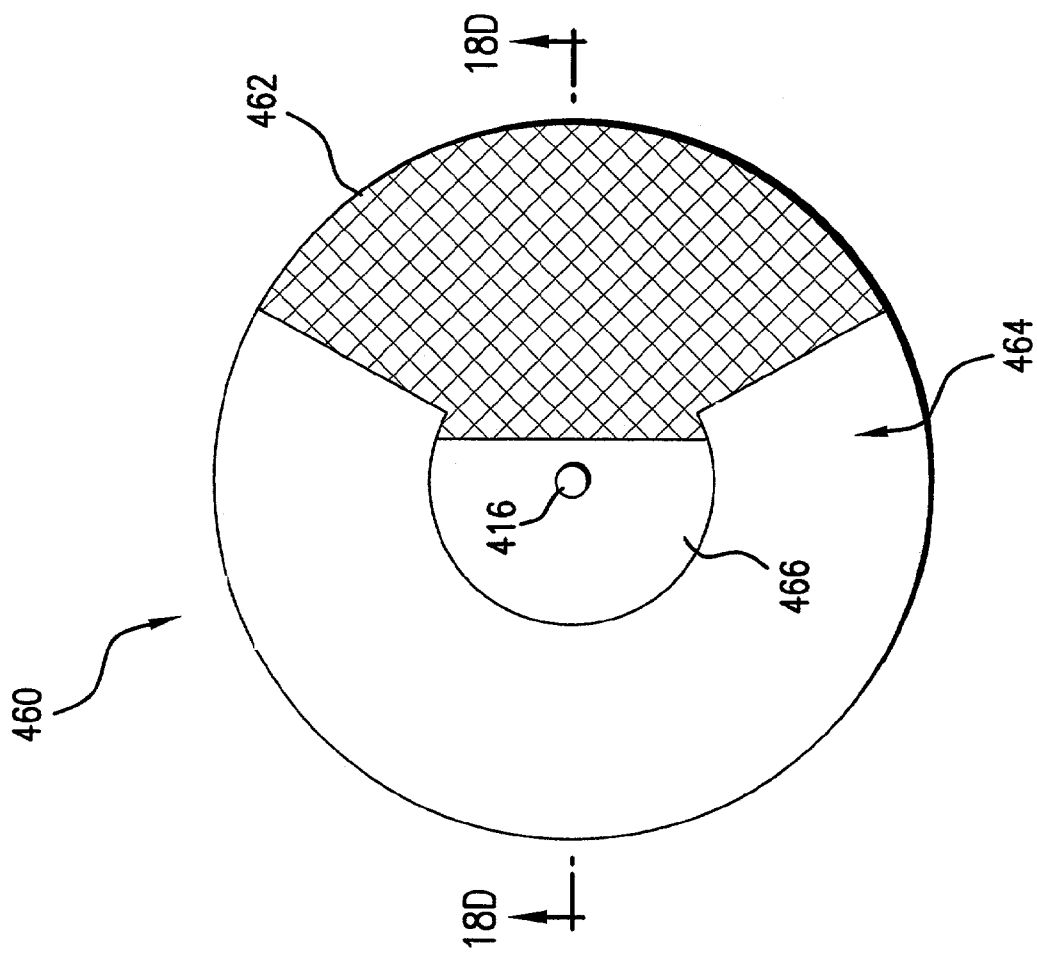

In an alternative embodiment, first and second rotatable structures 430 and 440 include an integral counterweight formed with the reflection sector (FIG. 18C). Rotatable structure 460 is machined to include reflection sector 462, "air-filled" gap transmission sector 464, and integral counterbalance 466. In FIG. 18D integral rotatable structure 460 is coupled through axle 416 to motor 418. In one variation, reflection sector 462 and integral counterbalance 466 are formed from a metal slug which is either milled or broached to the shape of structure 460 and so as to include axle hole 416. A portion of the integral structure is then milled or broached to thin the portion and form reflection sector 462 into a thinner thickness (see FIG. 18D). The metal sector that forms reflection sector 462 is then polished and plated to a flat reflection surface. The thickness of reflection sector 462 and the thickness of integral counterbalance 466 are designed to maintain dynamic balance in rotatable structure 460 about axle 416.

In another variation, reflection sector 462 may be formed of thinner stock (of a material such as glass, plastic, or metal) and thicker (D shaped) portions are bonded to the thinner stock at bonding surfaces 467 to form counterbalance portion 466. The thickness of reflection sector 462 and the thickness of bonded counterbalance 466 are designed to maintain dynamic balance in rotatable structure 460 about axle 416.

Figure 27C:
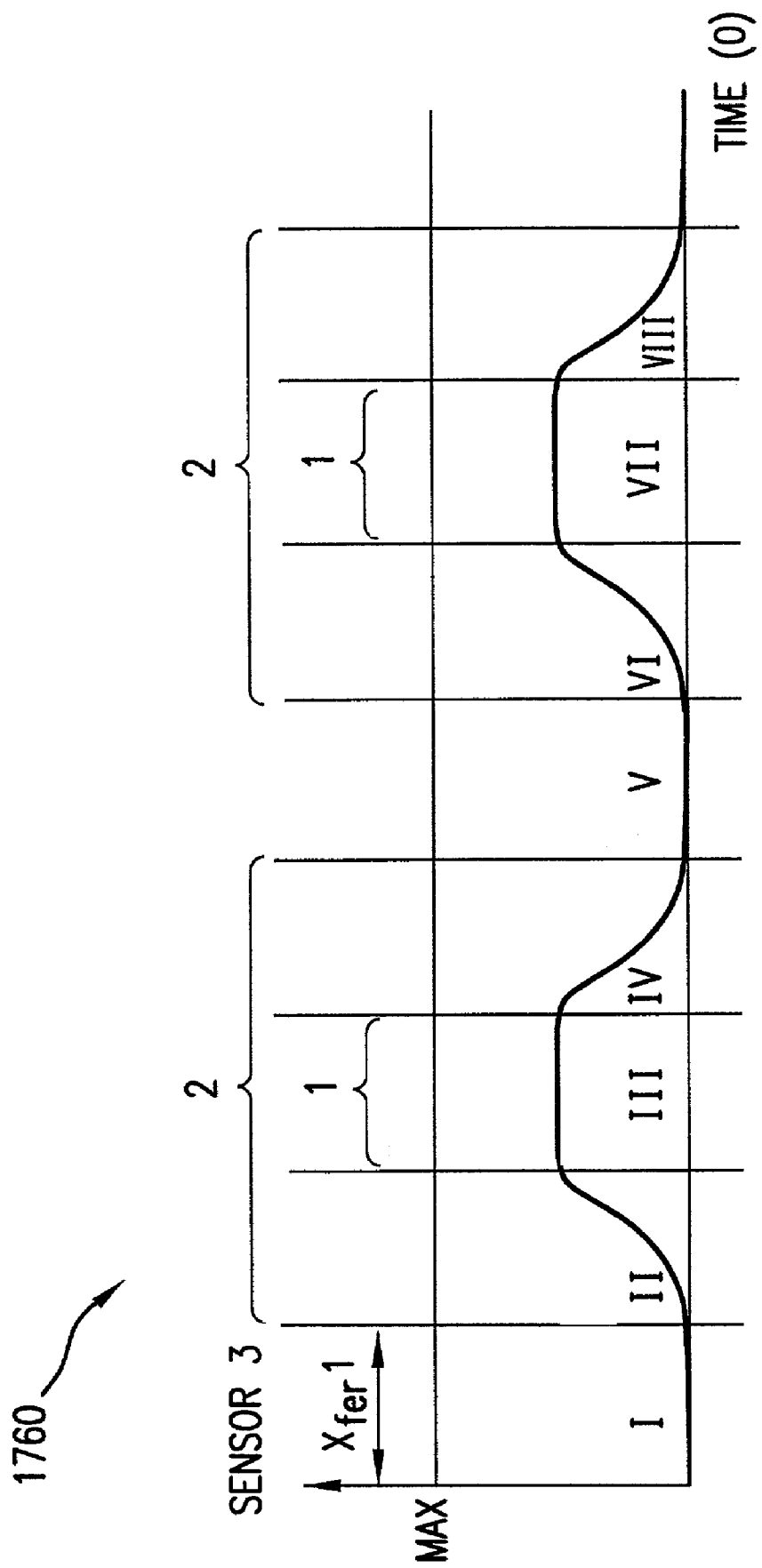

FIGS. 27A, 27B and 27C illustrate timing diagrams for the operation of the 3-chip camera 400. Timing for the operation of first imaging sensor 404 is denoted generally by reference numeral 1700 (FIG. 27A), timing for the operation of second imaging sensor 406 is denoted generally by reference numeral 1730 (FIG. 27B), and timing for the operation of third imaging sensor 408 is denoted generally by reference numeral 1760 (FIG. 27C). The operation of first rotatable structure 110 is separated into eight regions (denoted by Roman numerals I–VIII) that correspond to the sectors of first rotatable structure 110. The vertical axes in timing diagrams 1700, 1730, and 1760 represents the number of pixels illuminated in first, second, and third imaging sensors 404, 406, and 408, respectively. The horizontal axes represents the time, or phase, of the rotation of first and second rotatable structures 430 and 440.

Region I in timing diagram 1700 shows the charge integration in first imaging sensor 404 while the image light reflects from a central area of first reflection sector 452 such that every pixel on first imaging sensor 404 is illuminated. Charge is integrated in first imaging sensor 404 while the image light reflects from first reflection sector 452 onto first imaging sensor 404. As the rotatable structures 430 and 440 rotate, first reflection sector 452 moves out of the objective path of lens 402 while "air-filled" gap transmission sector 454 moves into the objective path of lens 402. Fewer pixels of first imaging sensor 404 are illuminated, as shown by region II in timing diagram 1700, as first reflection sector 452 moves out of the objective path. In one embodiment, charge integrates in first imaging sensor 404 only while first imaging sensor 404 is fully illuminated (bracket 1). In an alternative embodiment, charge integration in first imaging sensor 404 begins as first reflection sector 452 moves into the objective path of lens 402 and continues as first reflection sector 452 moves out of the objective path of lens 402 and fewer pixels in first imaging sensor 404 are illuminated (bracket 2).

Once "air-filled" gap transmission sector 454 has moved completely into the objective path of lens 402, the image light no longer reflects onto first imaging sensor 404, as shown by region III in timing diagram 1700. Charge is transferred (Xfer 1) from first imaging sensor 404 while "air-filled" gap transmission sector 454 passes the image to the third imaging sensor or second reflection sector 452' of the second rotatable structure 440 reflects light to the second imaging sensor so as to prevent the image light from impinging on first imaging sensor 404.

Timing diagram 1760 shows the charge integration in third imaging sensor 408 while the image light passes through an increasing portion of "air filled" gap transmission sector 454 (region II) until the image light passes through a central area of "air-filled" gap transmission sector 454 such that approximately half the total number of pixels on second imaging sensor 406 are illuminated (region III). Charge is integrated in third imaging sensor 408 while the image light passes through "air-filled" gap transmission sector 454 onto third imaging sensor 408. As the rotatable structures 430 and 440 rotate, "air-filled" gap transmission sector 454 moves out of the objective path of lens 402 while second reflection sector 452' moves into the objective path of lens 402. Fewer pixels of third imaging sensor 408 are illuminated, as shown by region IV in timing diagram 1760, as second reflection sector 452' moves into the objective path. In one embodiment, charge integrates in third imaging sensor 408 only while third imaging sensor 408 is maximally illuminated (bracket 1). In an alternative embodiment, charge integration in third imaging sensor 408 begins as "air-filled" gap transmission sector 454 moves into the objective path of lens 402 and continues as "air-filled" gap transmission sector 454 moves out of the objective path of lens 402 (region IV) and fewer pixels in third imaging sensor 408 are illuminated (bracket 2).

Once second reflection sector 452' has moved completely into the objective path of lens 402, the image light no longer reflects onto third imaging sensor 408 (region V). Charge is transferred (Xfer 1) from third imaging sensor 408 while second reflection sector 452' prevents the image light from impinging on third imaging sensor 408.

Timing diagram 1730 shows the charge integration in second imaging sensor 406 while the image light reflects from an increasing portion of second reflection sector 452' (region IV) until the image light reflects from a central area of second reflection sector 452' such that approximately half the total number of pixels on second imaging sensor 406 are illuminated (region III). Charge is integrated in second imaging sensor 406 while the image light reflects from second reflection sector 452' onto second imaging sensor 406. As the rotatable structures 430 and 440 rotate, second reflection sector 452' moves out of the objective path of lens 402 while "air-filled" gap transmission sector 454' moves into the objective path of lens 402. Fewer pixels of second imaging sensor 406 are illuminated, as shown by region VI in timing diagram 1730. In one embodiment, charge integrates in second imaging sensor 406 only while second imaging sensor 406 is fully illuminated (bracket 1). In an alternative embodiment, charge integration in second imaging sensor 406 begins as second reflection sector 452' moves into the objective path of lens 402 and continues as second reflection sector 452' moves out of the objective path of lens 402 and fewer pixels in second imaging sensor 406 are illuminated (bracket 2).

The cycle of charge integration in third imaging sensor 408 is repeated as "air-filled" gap transmission sector 454' moves into and out of the objective path of lens 402 and the image light passes through "air-filled" gap transmission sector 454' onto third imaging sensor 408 (regions VI–VIII). Charge is again transferred from third imaging sensor 408 once first reflection sector 452 is completely in the objective path of lens 402, thus preventing the image light from impinging on third imaging sensor 408 (region I). The entire cycle begins anew as first reflection sector 452 moves back into the objective path of lens 402 (region I in timing diagram 1700).

If first and second reflection sectors 452 and 452' are not completely reflective and if "air-filled" gap transmission sectors 454 and 454' are not completely transmissive, imaging sensors 404, 406, and 408 may include electronic shutter control such that neither sensor is capable of integrating charge during the charge transfer phase of their operation in order to avoid smear artifacts.

Furthermore, due to the wedge shape of reflection sectors 452 and 452' and "air-filled" gap transmission sectors 454 and 454', the pixels of imaging sensors 404, 406, and 408 disposed along the outer radius of the rotatable structures 430 and 440 will be illuminated for a longer period of time than the pixels disposed along the inner radius of the rotatable structures 430 and 440. The resulting image may be adjusted in post-processing to allow for the difference in the amount of charge integrated for different parts of the image. The pixel values can be weighted allow for normalization of the resulting image.

Figure 28:
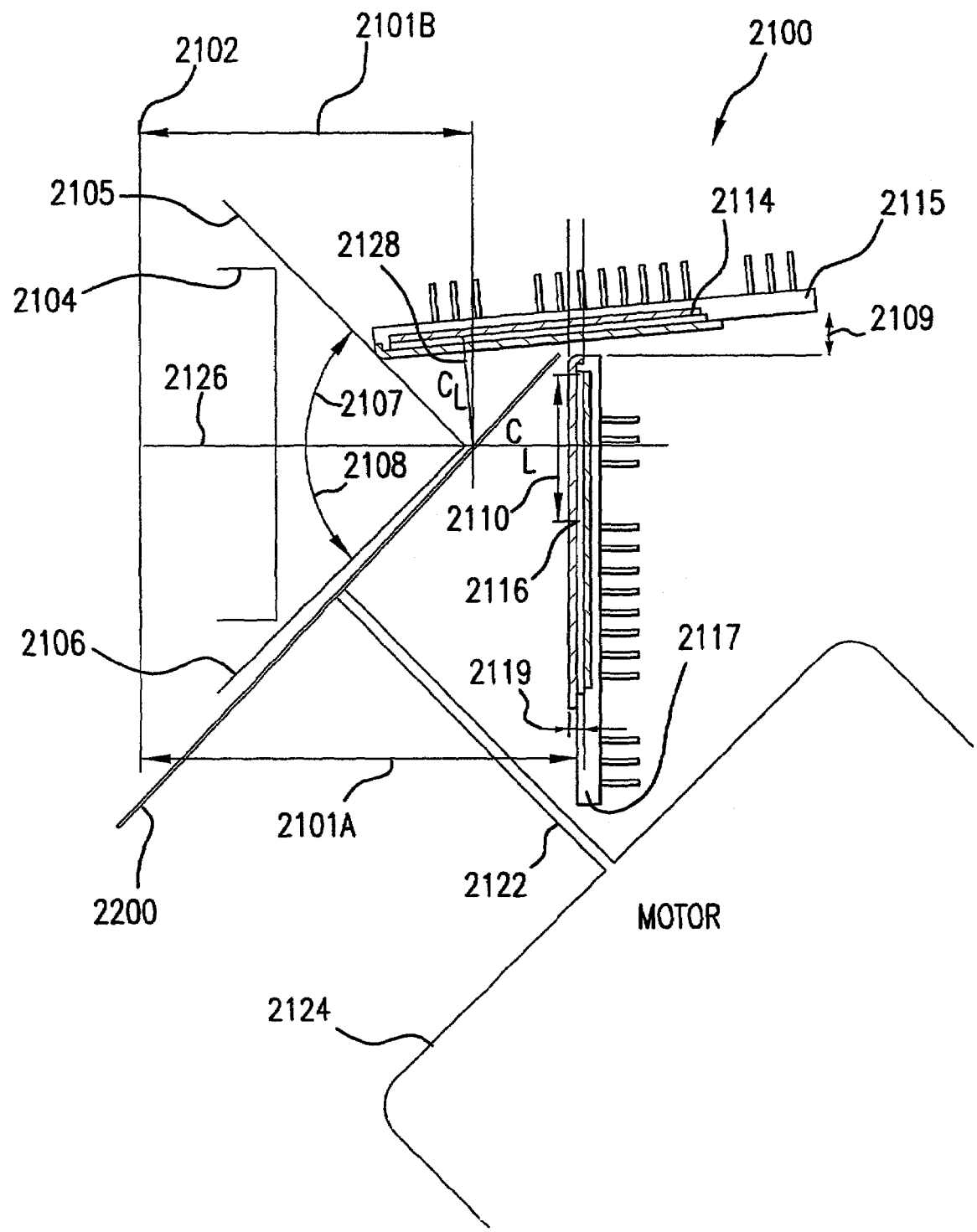
FIG. 28 is a schematic diagram of an alternative embodiment of the invention.
Figure 29B:
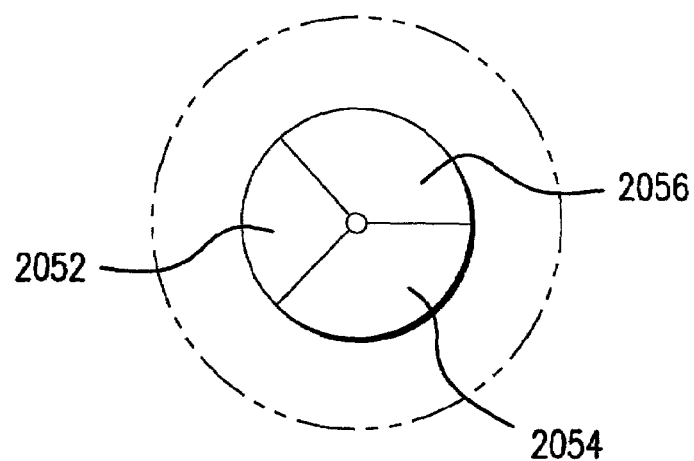
FIGS. 29A and 29B are schematic diagrams of a known color camera.
Figure 29A:
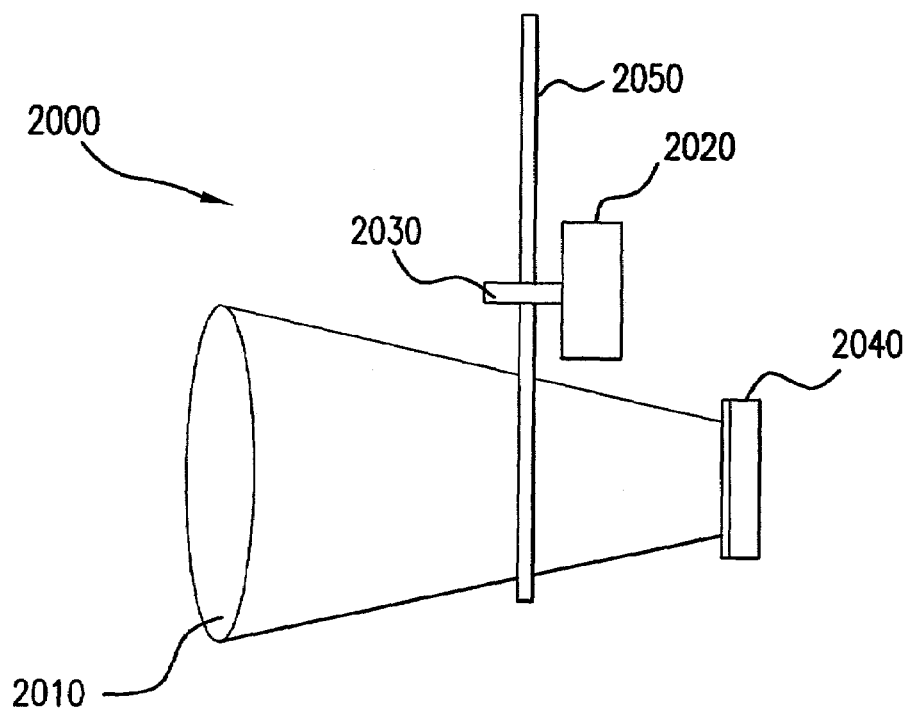

In FIG. 28 (a variant of the embodiment of FIG. 1), camera 2100 includes a lens generally disposed at plane 2101 but focusable to a location at 2104, first imaging sensor 2114, second imaging sensor 2116, and rotatable structure 2200. First imaging sensor 2114 is disposed to receive light that propagates along reflected axis 2128 and second imaging sensor 2116 is disposed to receive light that propagates along direct axis 2126. Rotatable structure 2200 is disposed to define a rotation plane that is oblique to both reflected axis 2128 and direct axis 2126. In operation, motor 2124 rotates axle 2122 that in turn rotates rotatable structure 2200. The lens at plane 2102 focuses an image conjugate onto second imaging sensor 2116 along direct axis 2126 such that second imaging sensor 2116 converts the image light into electrical signals. This focal length, denoted 2101A, is about 52 millimeters in this example. The lens at plane 2102 also focuses the image conjugate onto first imaging sensor 2114 along reflected axis 2128. The image light through the lens along direct axis 2126 is reflected from a reflection sector of rotatable structure 2200 to propagate along reflected axis 2128. First imaging sensor 2114 converts the image light into electrical signals. Rotatable structure 2200 is formed as a ring having an inner radius such that the image light focused by the lens does not impinge on motor 2124 but only on the surface of rotatable structure 2200.

In camera 2100 of FIG. 28, light may be focused by the lens in the region between angles 2105 and 2106. An image center point is defined at the intersection of reflected axis 2128 (with centerline label) and direct axis 2126 (with centerline label), or at distance 2101B, about 39 millimeters behind plane 2102 in this example. Light is focused by the lens through the area between angle 2105 and 2106. In this example, the angle between angle 2105 and direct axis 2126 is 45 degrees, and the angle between direct axis 2126 and angle 2106 is also 45 degrees. However, in this example, the plane of rotation of rotatable structure 2200 and angle 2106 is 2.5 degrees. This tends to avoid certain reflection issues in the camera. Sensor 2114 is disposed perpendicular to reflection axis 2128, and therefore, sensor 2114 is canted by angle 2109 (5 degrees in this example) with respect to direct axis 2126. The image conjugate is focused through aperture 2110 that is comparable to the vertical aperture used in 35 millimeter film cinematography.

Second sensor 2116 is mounted in package 2117 and covered with a transparent window. Distance 2119 between the transparent window outer surface and the sensor top surface is about 1.8 millimeters in this example. Similarly, first sensor 2114 is mounted in package 2115 and covered with a transparent window.

Having described preferred embodiments of a novel chopped color camera with solid state imaging sensors (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A camera comprising:
    a first sensor disposed to image light that propagates along a reflected axis;
    a second sensor disposed to image light that propagates along a direct axis; and
    a rotatable structure disposed to define a rotation plane that is oblique to both the reflected axis and the direct axis, the rotatable structure having a first reflection sector, a first opaque sector disposed adjacent to the first reflection section, a first transmission sector disposed adjacent to the first opaque sector, a second reflection sector disposed adjacent to the first transmission sector, and a second transmission sector disposed adjacent to the second reflection sector.

2. The camera of claim 1, wherein the rotatable structure further includes a third reflection sector disposed adjacent to the second transmission sector and a third transmission sector disposed adjacent to the third reflection sector.

3. A camera according to claim 1, wherein:
    the rotatable structure and the first and second sensors are configured so that the light that propagates along the reflected axis is reflected from the first and second reflection sectors; and
    the first and second reflection sectors further include a coating that filters out near infrared wavelengths of the light.

4. A method comprising steps of (1) operating a first sensor of a camera to integrate a first charge over a first time interval, (2) operating a second sensor of the camera to integrate a second charge over a second time interval and (3) scanning the first and second sensors to readout the respective first and second charges during a third time interval, wherein:
    the operating of the first sensor includes integrating the first charge in the first sensor while a first image light reflects from a first reflection sector of a rotatable structure onto the first sensor;
    the operating of the second sensor includes integrating the second charge in the second sensor while a second image light passes through a first transmission sector of the rotatable structure onto the second sensor;
    the scanning includes transferring the integrated first and second charges from the respective first and second sensors while a first opaque sector of the rotatable structure prevents the first and second image light from impinging on at least one of the first and second sensors;
    the first time interval overlaps the second time interval;
    the third time interval includes no overlapping time with the first time interval;
    the third time interval includes no overlapping time with the second time interval;
    the operating of the first sensor further includes integrating the first charge in the first sensor while the first image light reflects from a second reflection sector of the rotatable structure onto the first sensor; and
    the operating of the second sensor further includes integrating the second charge in the second sensor while the second image light passes through a second transmission sector of the rotatable structure onto the second sensor.

5. A method comprising steps of (1) operating a first sensor of a camera to integrate a first charge over a first time interval, (2) operating a second sensor of the camera to integrate a second charge over a second time interval and (3) scanning the first and second sensors to readout the respective first and second charges during a third time interval, wherein:
    the operating of the first sensor includes integrating the first charge in the first sensor while a first image light reflects from a first reflection sector of a rotatable structure onto the first sensor;
    the operating of the second sensor includes integrating the second charge in the second sensor while a second image light passes through a first transmission sector of the rotatable structure onto the second sensor;
    the scanning includes transferring the integrated first and second charges from the respective first and second sensors while a first opaque sector of the rotatable structure prevents the first and second image light from impinging on at least one of the first and second sensors;
    the first time interval overlaps the second time interval;
    the third time interval includes no overlapping time with the first time interval;
    the third time interval includes no overlapping time with the second time interval;
    the integrating of the first charge in the first sensor while the first image light reflects from the first reflection sector occurs during the first time interval;
    the integrating of the second charge in the second sensor while the second image light passes through the first transmission sector occurs during an overlapping period of the first and second time intervals;
    the operating of the first sensor further includes integrating the first charge in the first sensor while the first image light reflects from a second reflection sector of the rotatable structure onto the first sensor during the overlapping period of the first and second time intervals;
    the operating of the second sensor further includes integrating the second charge in the second sensor while the second image light passes through a second transmission sector of the rotatable structure onto the second sensor during the second time interval; and
    the transferring of the integrated first and second charges occurs during the third time interval.

6. The method of claim 4, including steps of:
    the step of operating the first sensor further includes integrating the first charge in the first sensor while the first image light reflects from a third reflection sector of the rotatable structure onto the first sensor; and
    the step of operating the second sensor further includes integrating the second charge in the second sensor while the second image light passes through a third transmission sector of the rotatable structure onto the second sensor.

7. The method of claim 4, wherein:

the time period while operating the second sensor to integrate the second charge in the second sensor while the second image light passes through a second transmission sector is included within the first time interval; and the step of operating the first sensor further includes integrating the first charge in the first sensor while the first image light reflects from a third reflection sector of the rotatable structure onto the first sensor during the overlapping period of the first and second time intervals; and the step of operating the second sensor further includes integrating the second charge in the second sensor while the second image light passes through a third transmission sector of the rotatable structure onto the second sensor during the second time interval.

* * * * *